(12) United States Patent
Pipp et al.

(10) Patent No.: US 8,905,458 B2
(45) Date of Patent: Dec. 9, 2014

(54) ACCESS PORT COVER

(75) Inventors: Walter Pipp, Birmingham, MI (US);
Todd Hemingway, Metamora, MI (US);
Joe Ponteri, Western Springs, IL (US);
Todd Murray, Gaines, MI (US)

(73) Assignee: A. Raymond et Cie, Grenoble Cedex 1 (FR)

( * ) Notice: Subject to any disclaimer, the term of this patent is extended or adjusted under 35 U.S.C. 154(b) by 540 days.

(21) Appl. No.: 12/753,375

(22) Filed: Apr. 2, 2010

(65) Prior Publication Data
US 2010/0252565 A1   Oct. 7, 2010

Related U.S. Application Data

(60) Provisional application No. 61/211,774, filed on Apr. 2, 2009.

(51) Int. Cl.
*B62D 25/00* (2006.01)
*B60K 15/05* (2006.01)

(52) U.S. Cl.
CPC .......... *B60K 15/05* (2013.01); *B60K 2015/053* (2013.01)
USPC .......... 296/97.22; 141/348; 141/94; 220/86.2

(58) Field of Classification Search
USPC ........ 141/348–350; 220/86.2, 825; 296/97.22
See application file for complete search history.

(56) References Cited

U.S. PATENT DOCUMENTS

| | | | |
|---|---|---|---|
| 3,295,726 A | 1/1967 | Hanson | |
| 5,465,861 A * | 11/1995 | Kunz et al. | 220/260 |
| 5,485,871 A * | 1/1996 | Romanek et al. | 141/312 |
| 6,279,626 B1 * | 8/2001 | Schmitt et al. | 141/348 |
| 6,880,594 B1 * | 4/2005 | Benjey | 141/350 |
| 7,185,938 B2 | 3/2007 | Beck | |
| 7,258,386 B2 | 8/2007 | Leitner | |
| 7,311,348 B1 | 12/2007 | Bang | |
| 7,671,482 B2 * | 3/2010 | Tighe | 307/9.1 |
| 8,089,228 B2 * | 1/2012 | Ballard | 318/255 |
| 8,439,421 B2 * | 5/2013 | Mihai | 296/97.22 |
| 2006/0162813 A1 * | 7/2006 | Walkowski | 141/350 |
| 2007/0257036 A1 | 11/2007 | Nance | |
| 2009/0188582 A1 * | 7/2009 | Hagano et al. | 141/349 |

OTHER PUBLICATIONS

International Search Report and Written Opinion, A. Raymond et Cie, Jun. 7, 2010.

* cited by examiner

*Primary Examiner* — Timothy L Maust
*Assistant Examiner* — Timothy P Kelly
(74) *Attorney, Agent, or Firm* — McDonald Hopkins LLC

(57) ABSTRACT

An access port cover is described. The access sport cover may seal an aperture located in a vehicle body whereby the access port cover may also provide access to a terminal located within the body. The access port cover may include a cover, a hinge mechanism and a linkage mechanism. The cover may include an outer portion and an inner portion, wherein the inner portion may include a first and a second end. The hinge mechanism may be located on each end of the inner portion. The linkage mechanism may be connected to the hinge mechanism, wherein the linkage mechanism may the said cover towards and away from the aperture. The cover and the linkage mechanism may be rotated into and stored within the body when the cover is not sealing the aperture in a closed position.

17 Claims, 27 Drawing Sheets

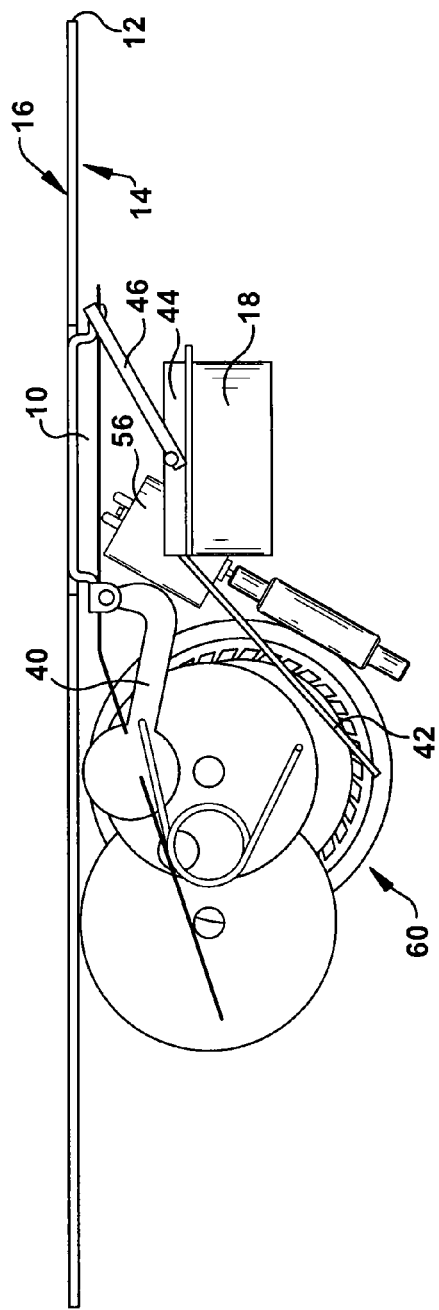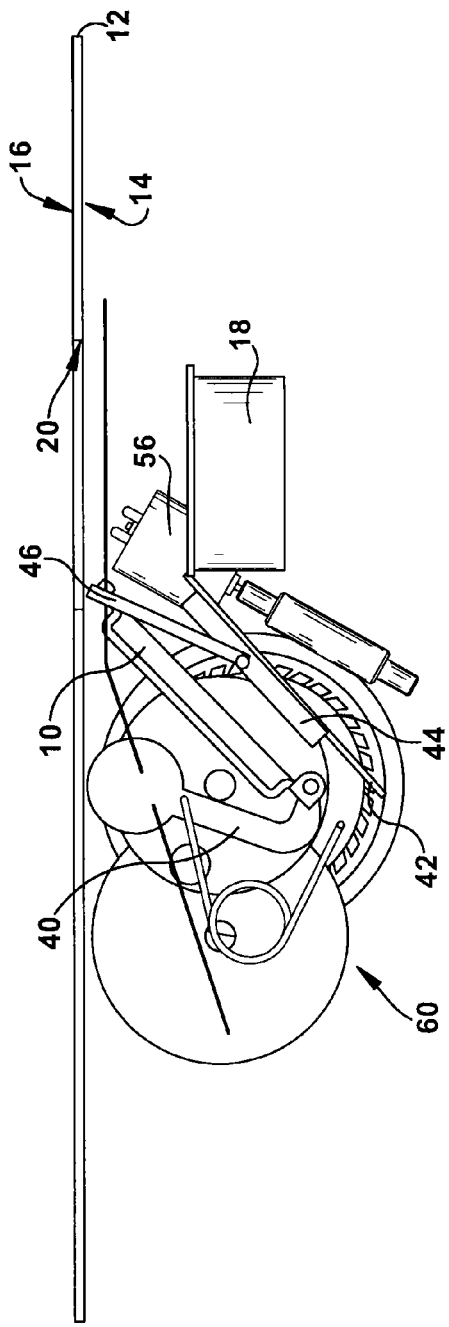
Figure 5A
Figure 5B

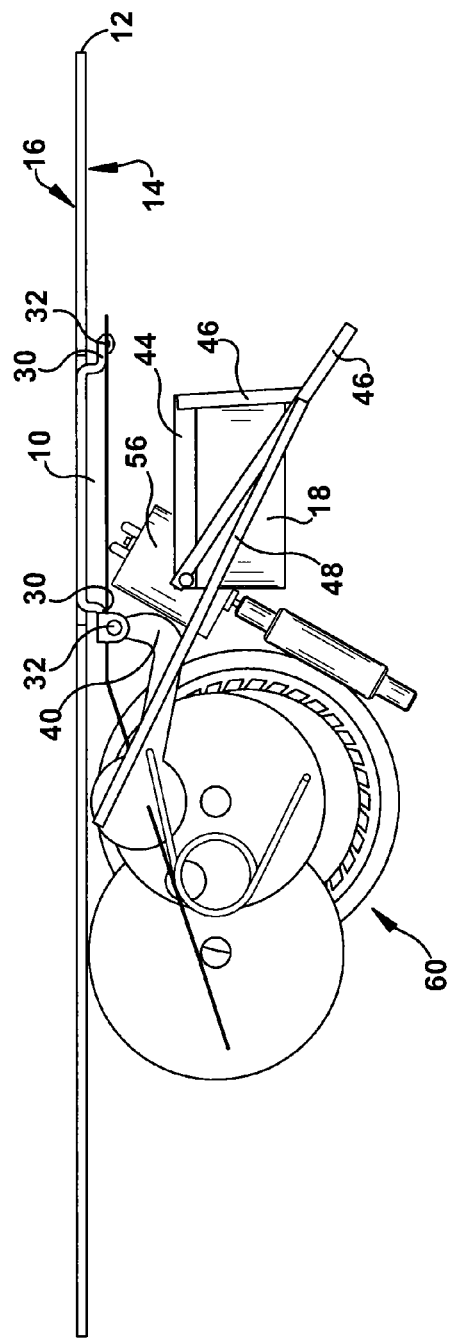
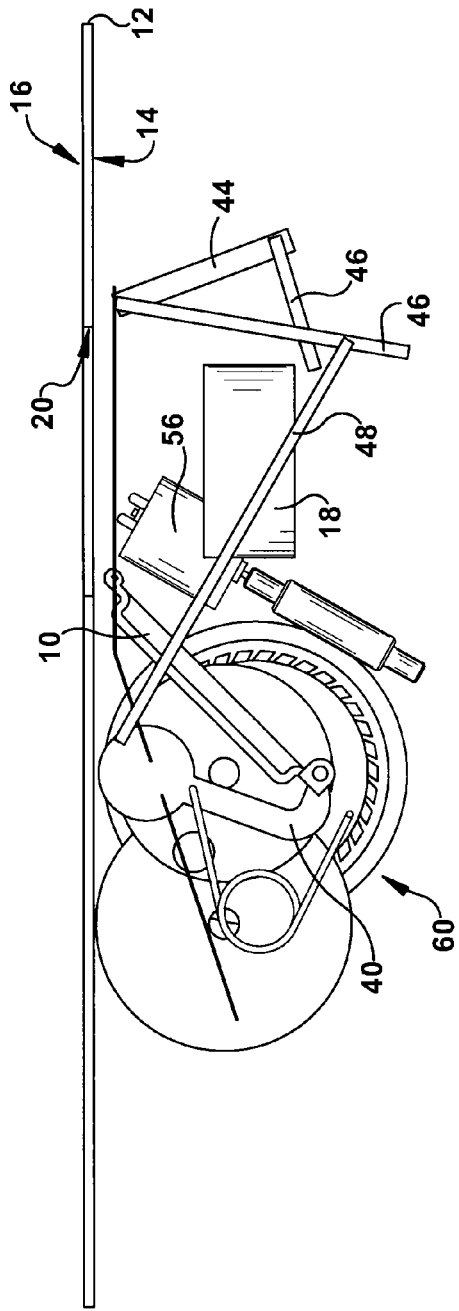
Figure 6A
Figure 6B

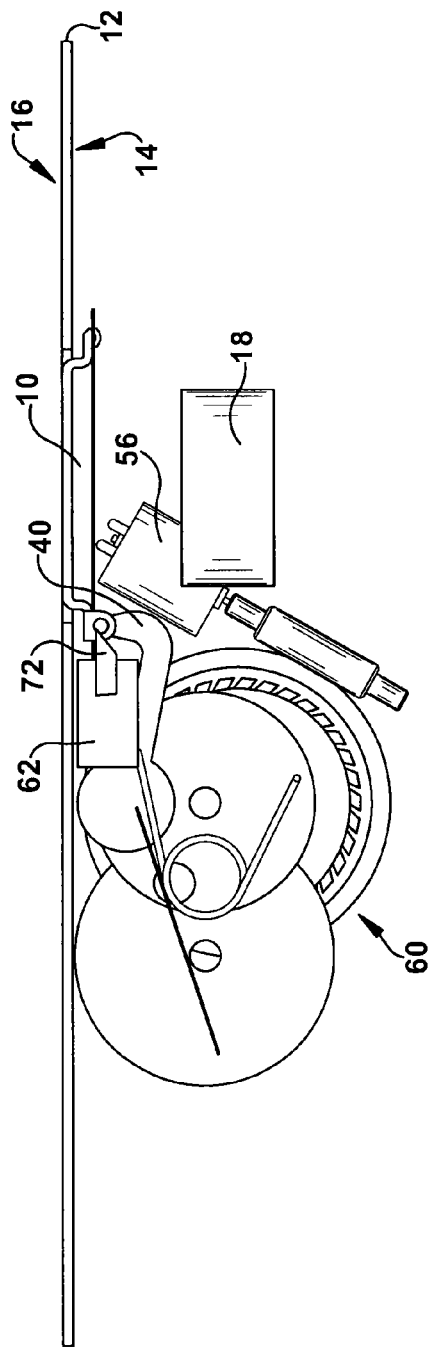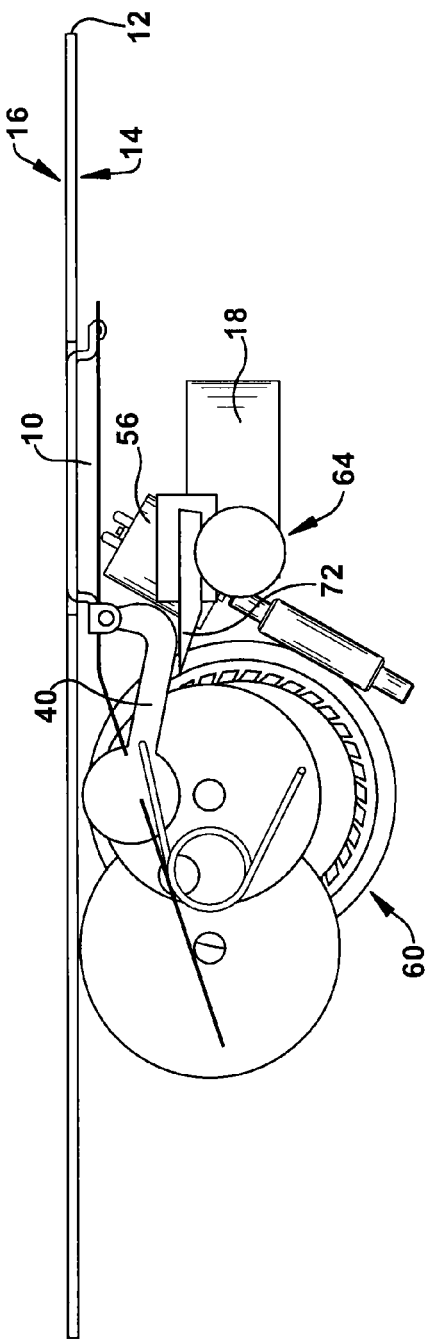
Figure 7A
Figure 7B

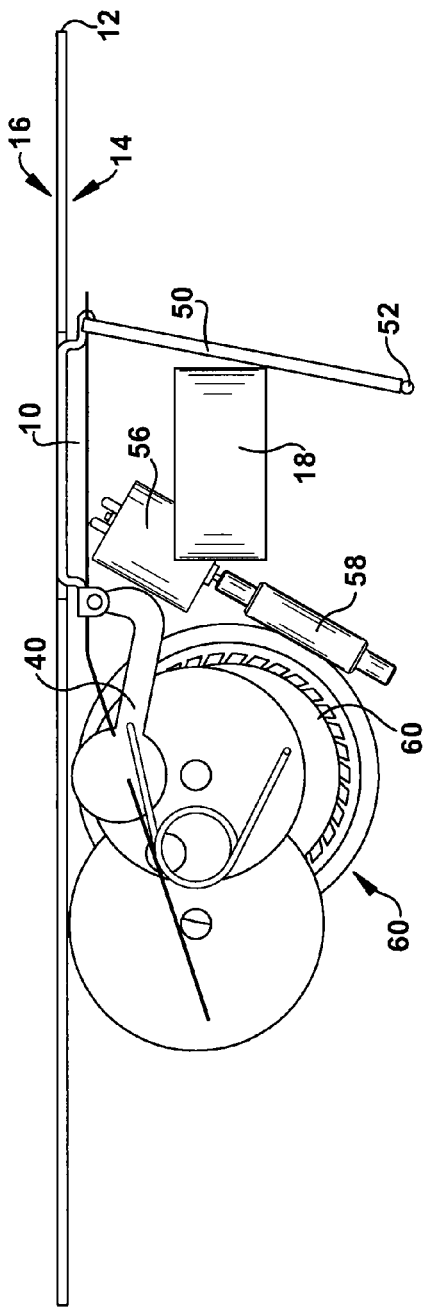
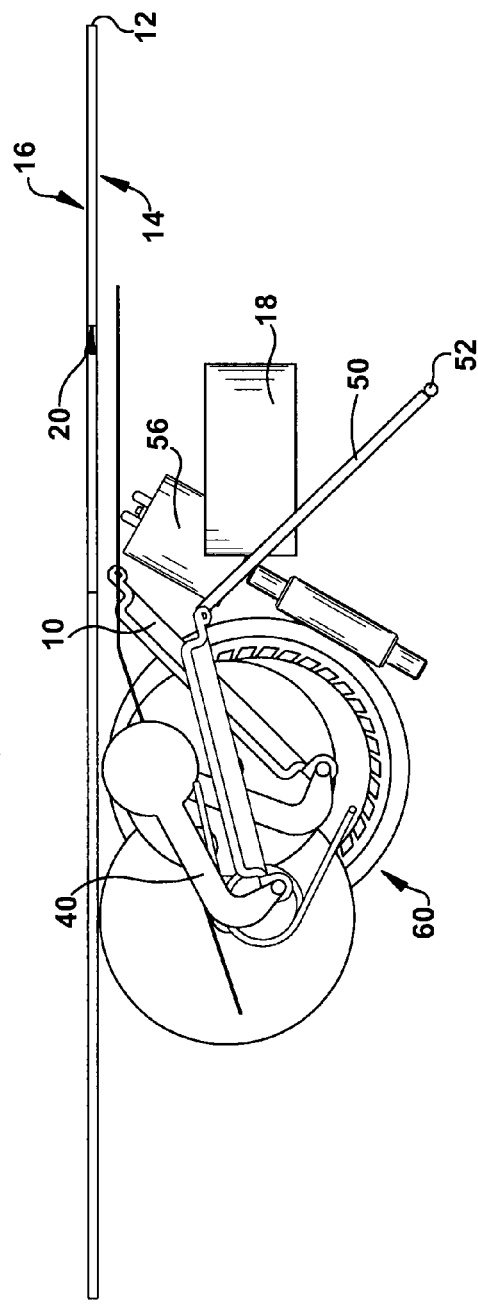

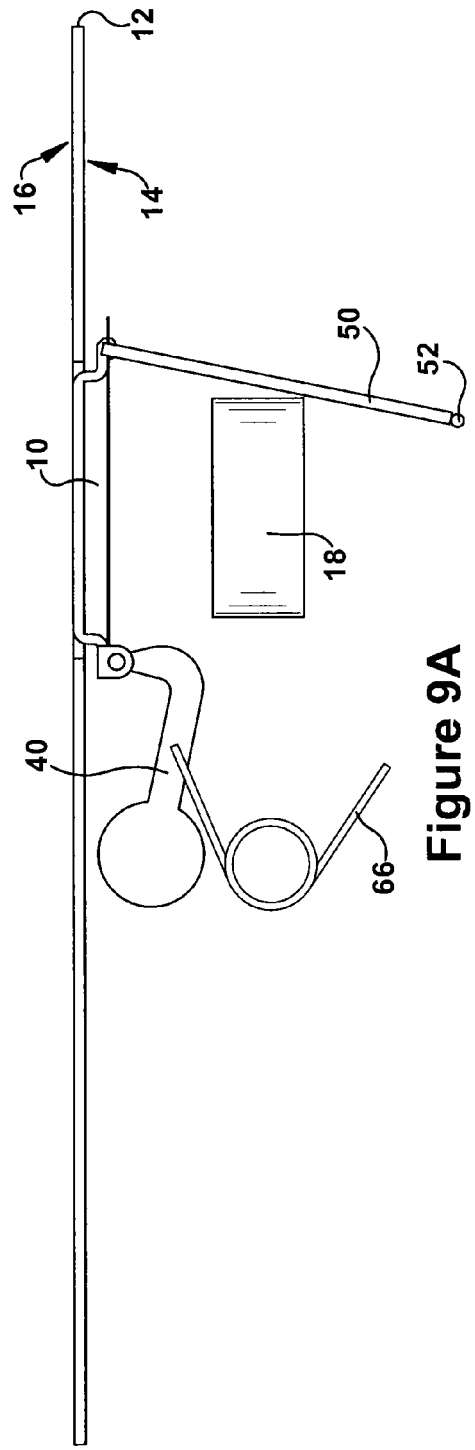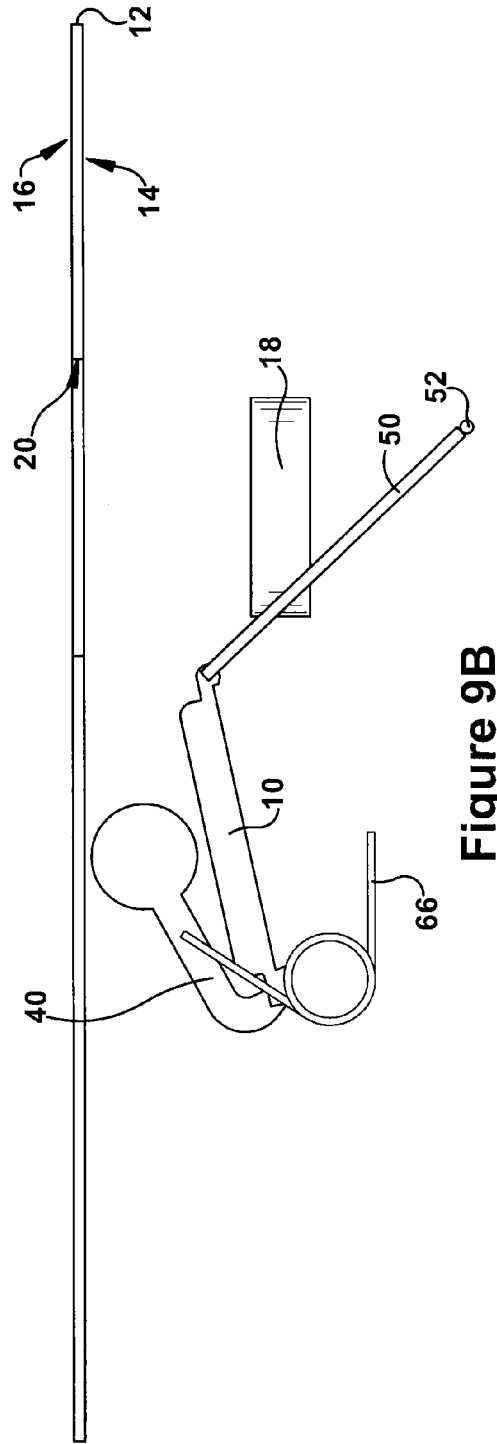
Figure 9A
Figure 9B

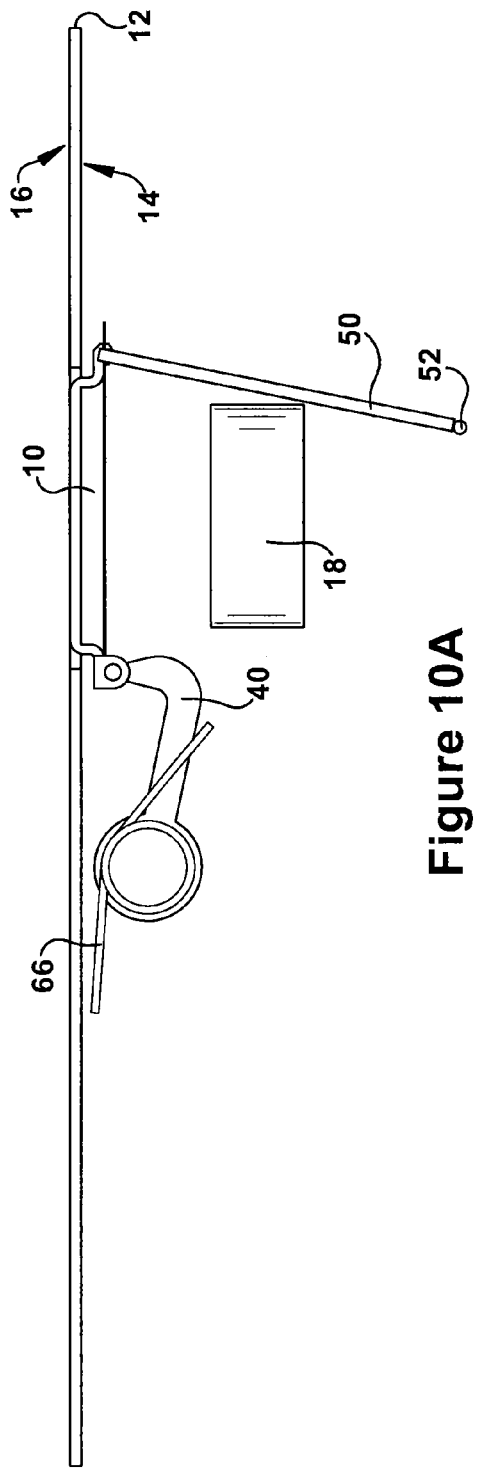
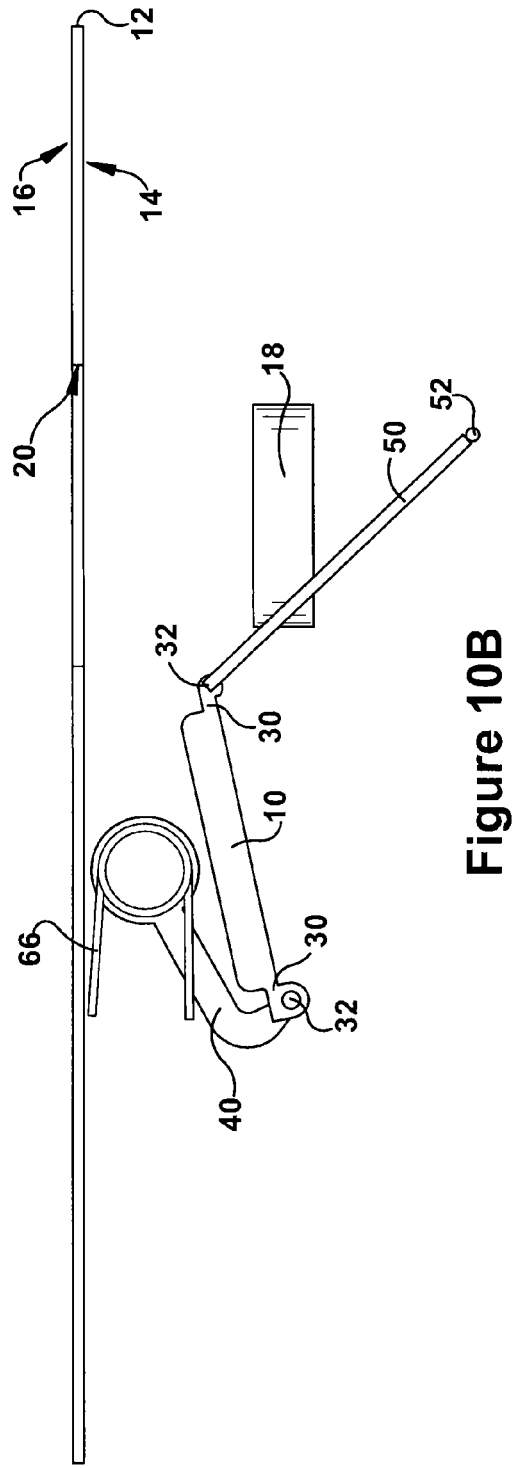
Figure 10A
Figure 10B

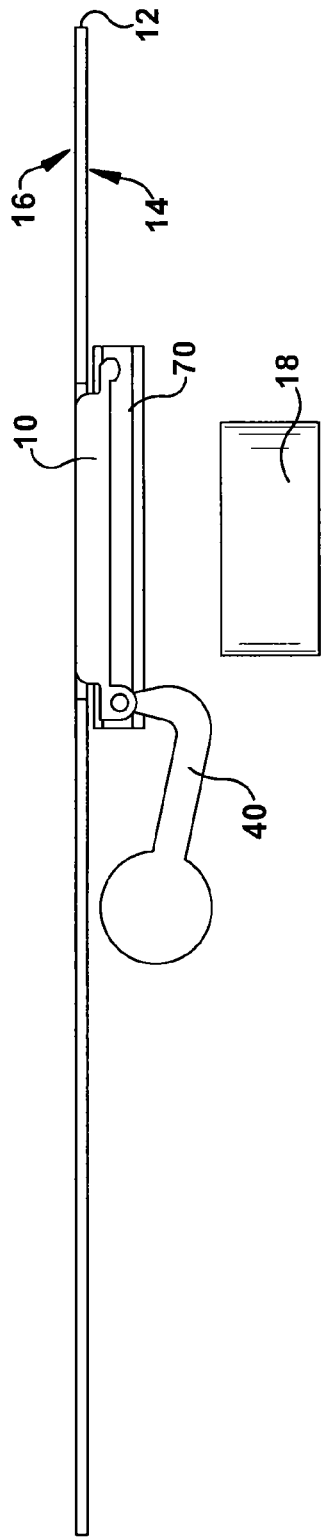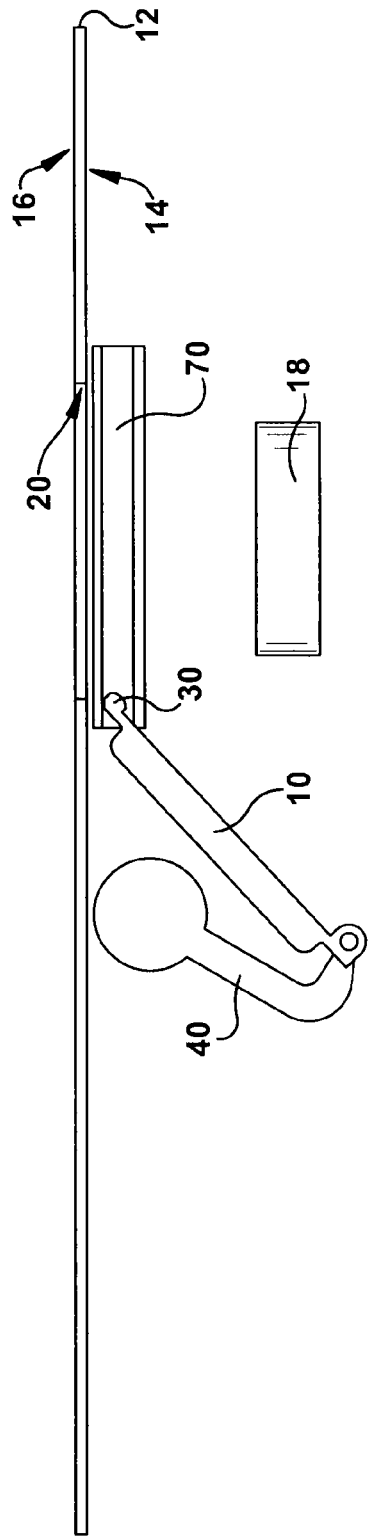
Figure 11A
Figure 11B

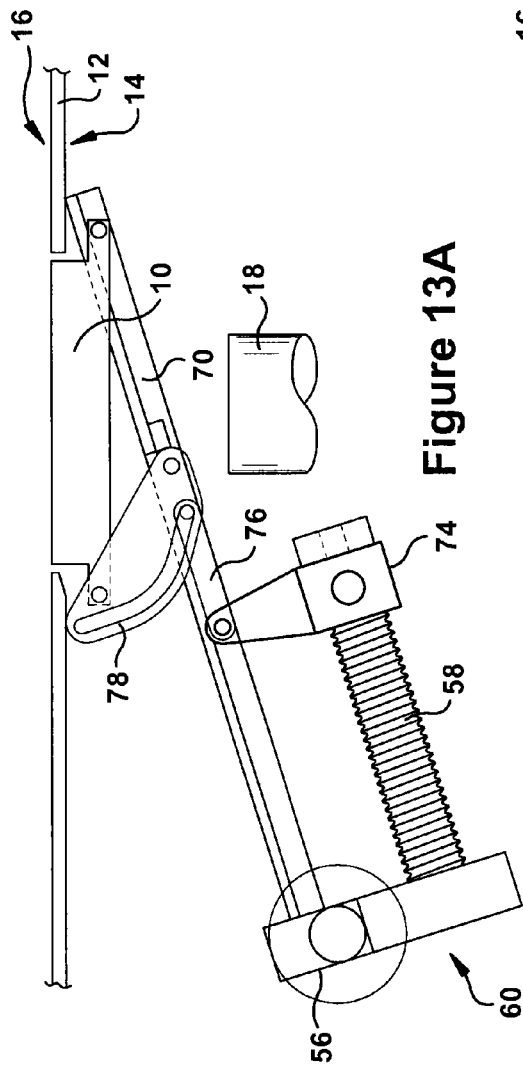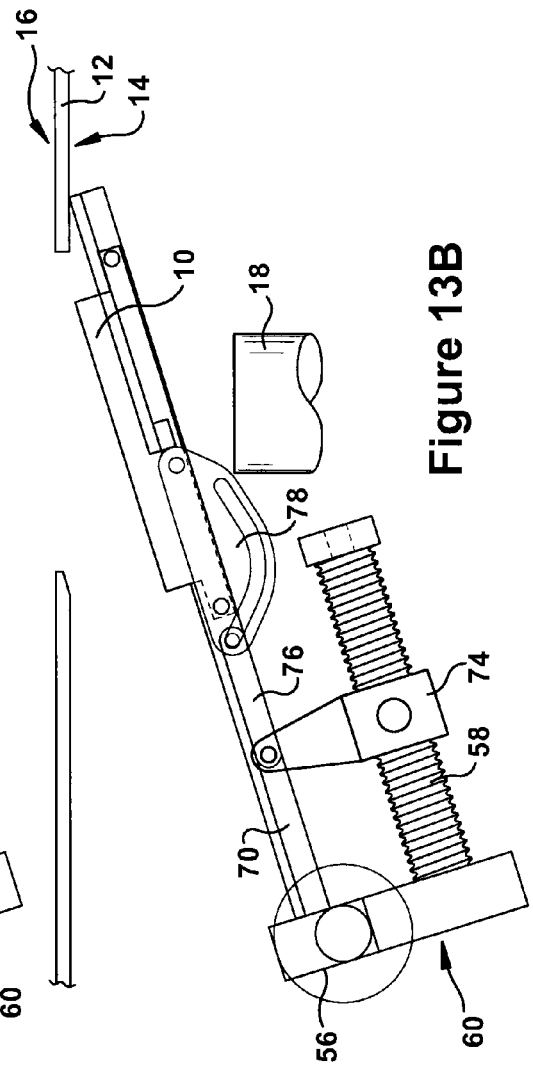

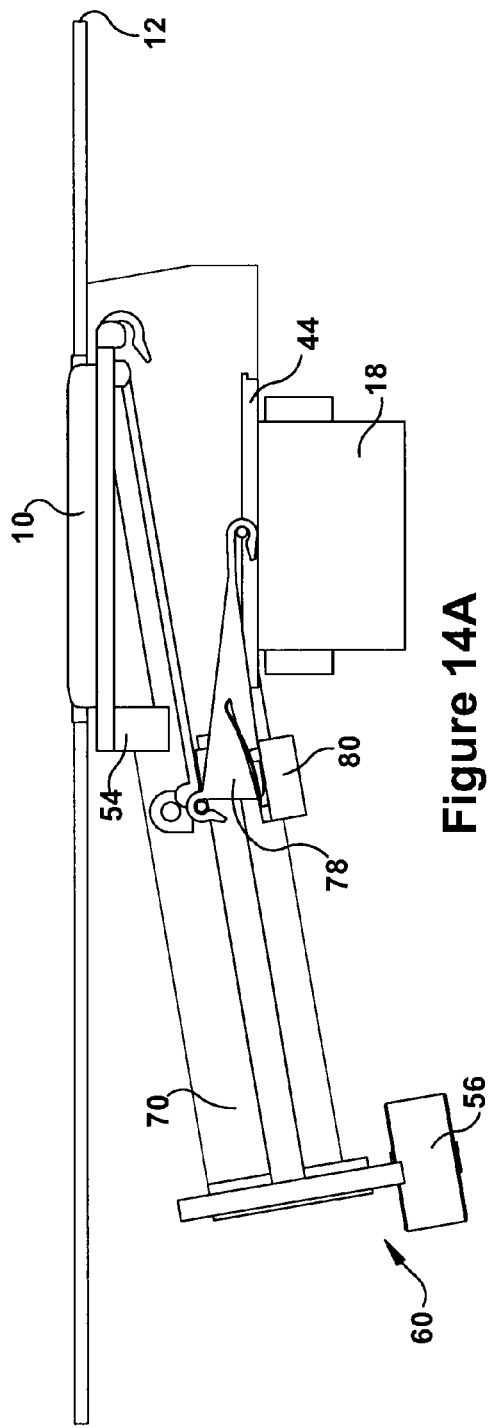
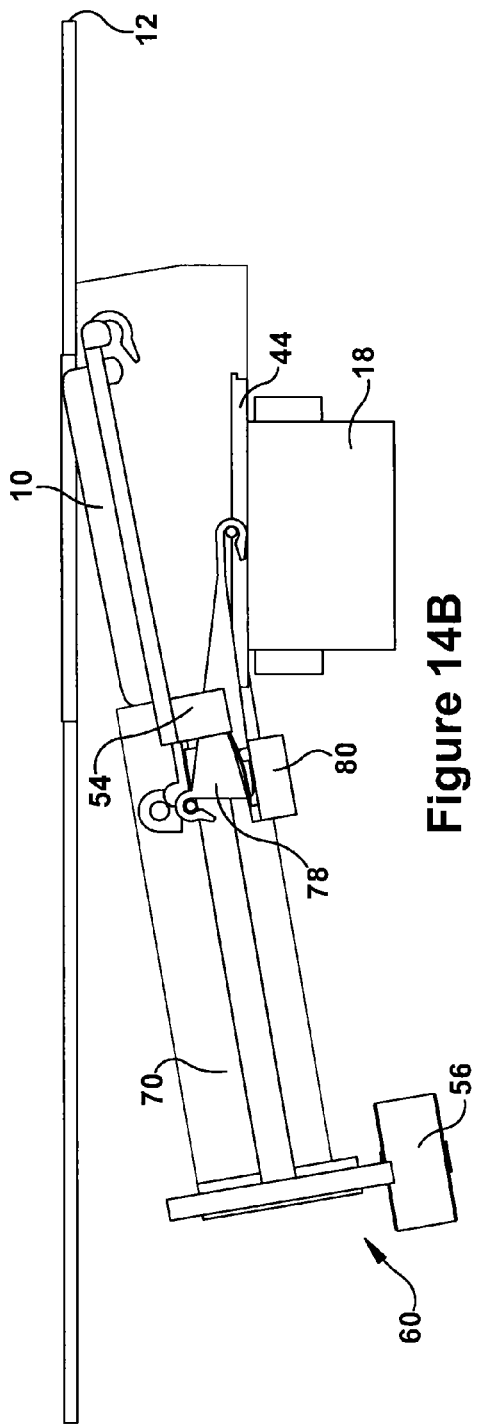
Figure 14A
Figure 14B

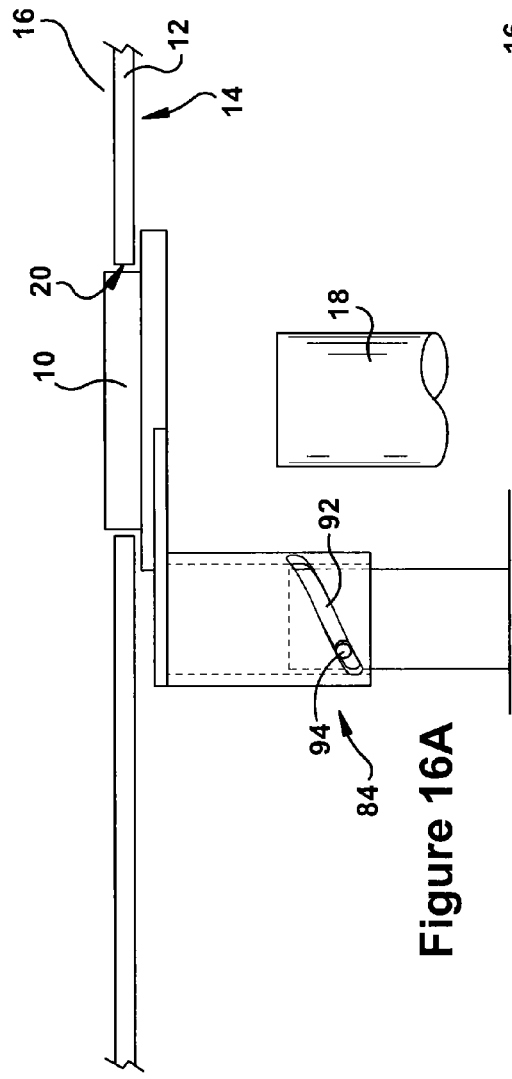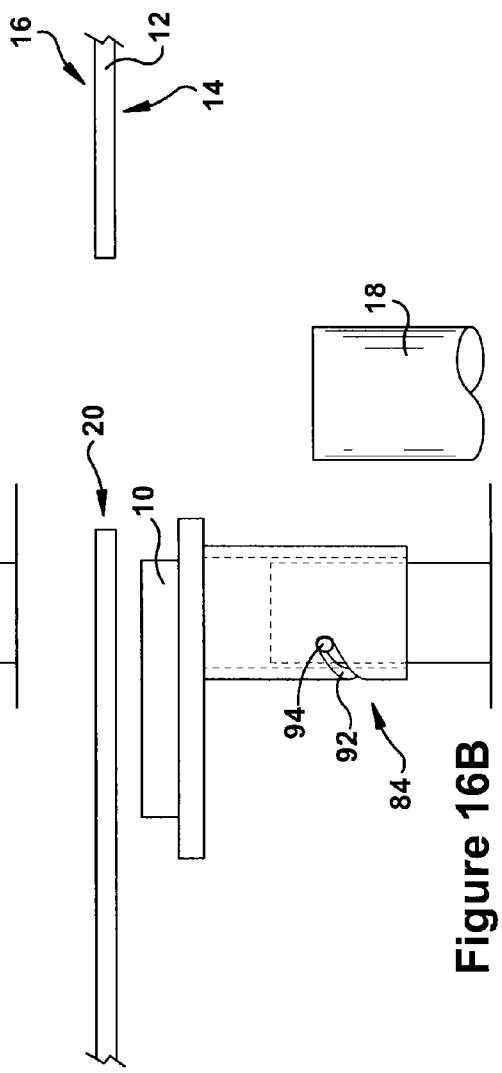

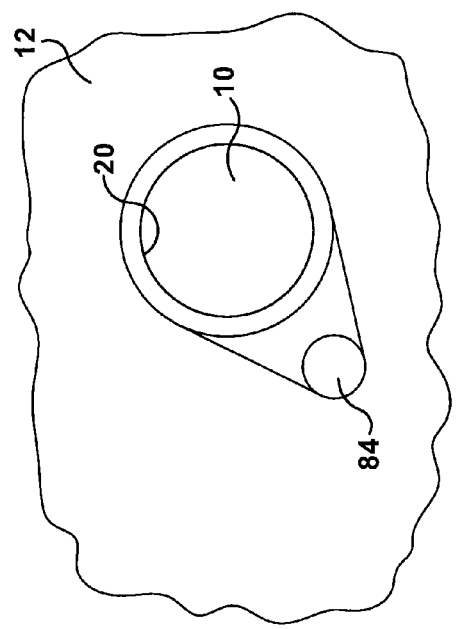
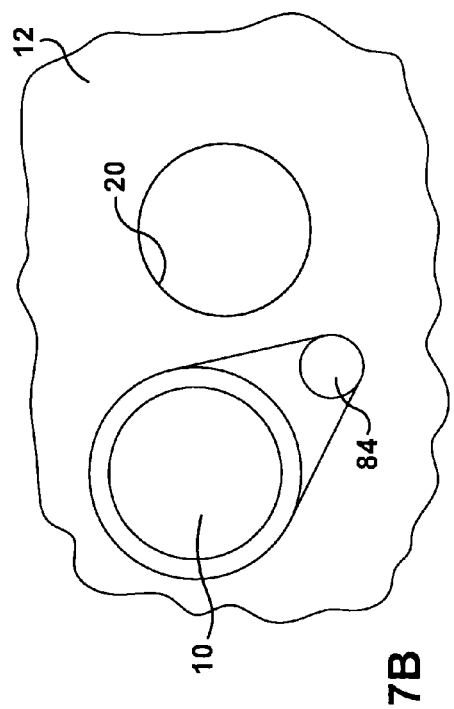
Figure 17A
Figure 17B

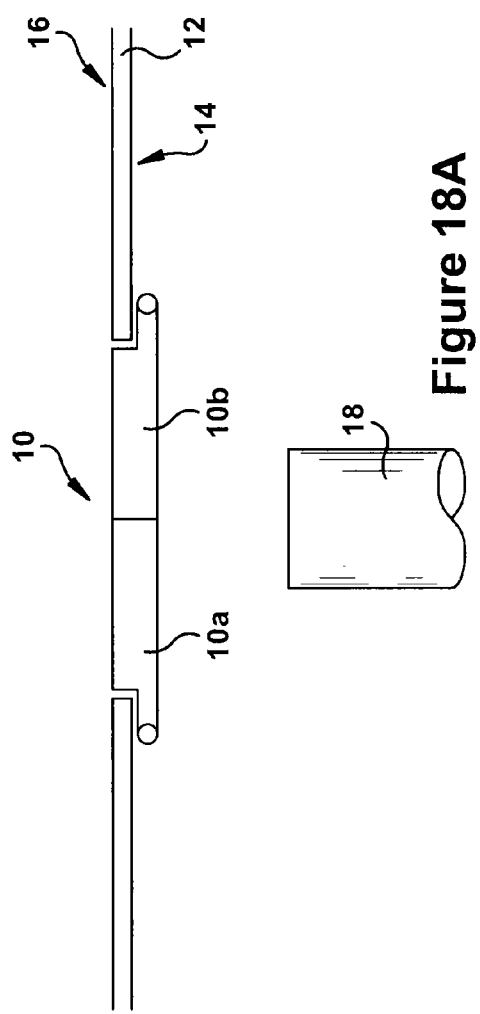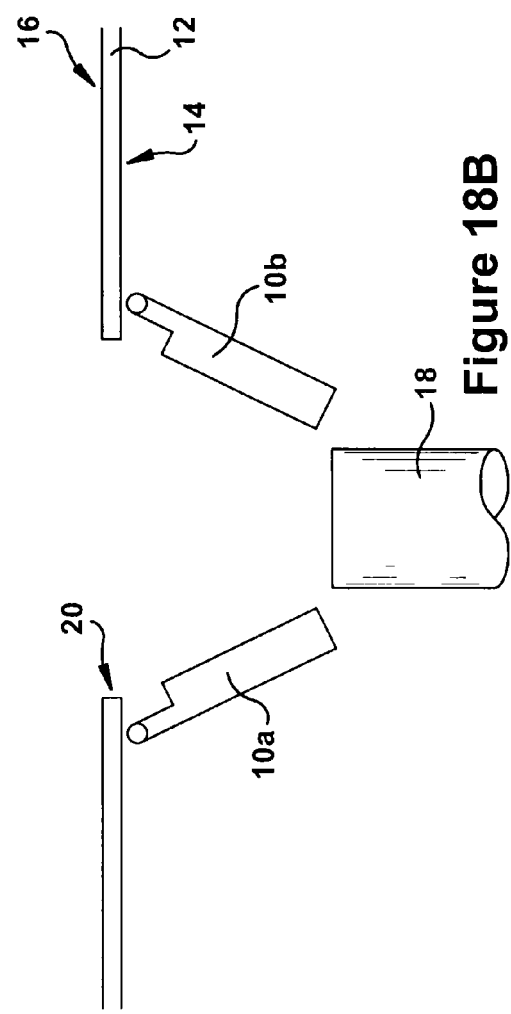

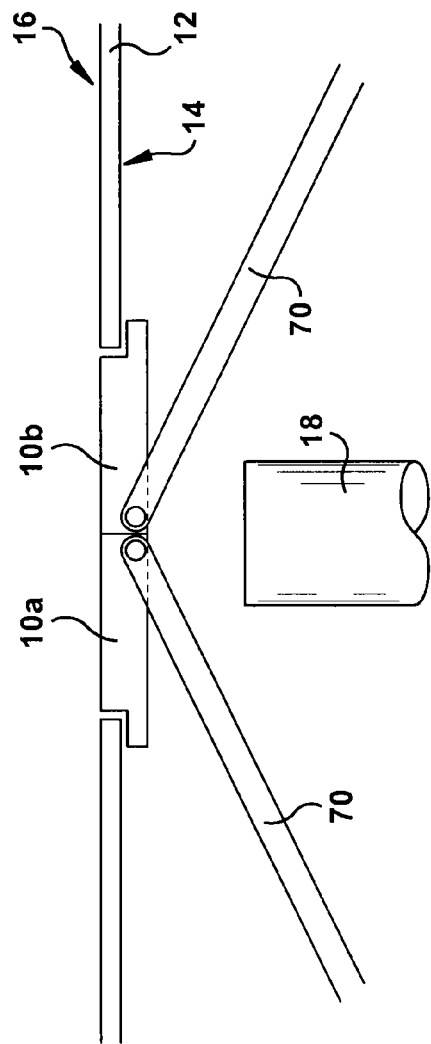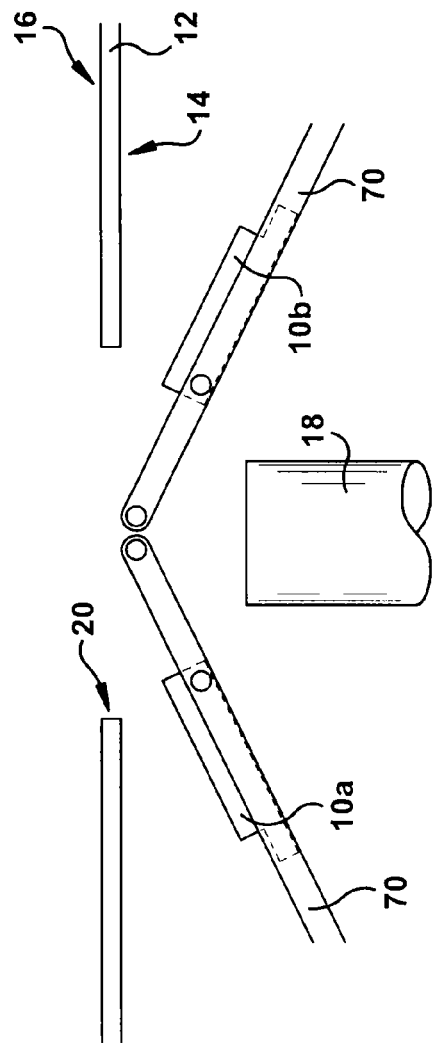
Figure 19A
Figure 19B

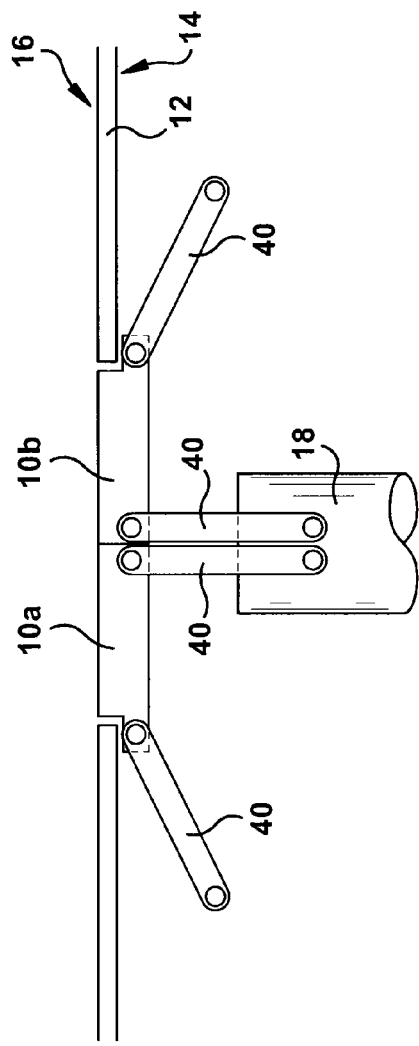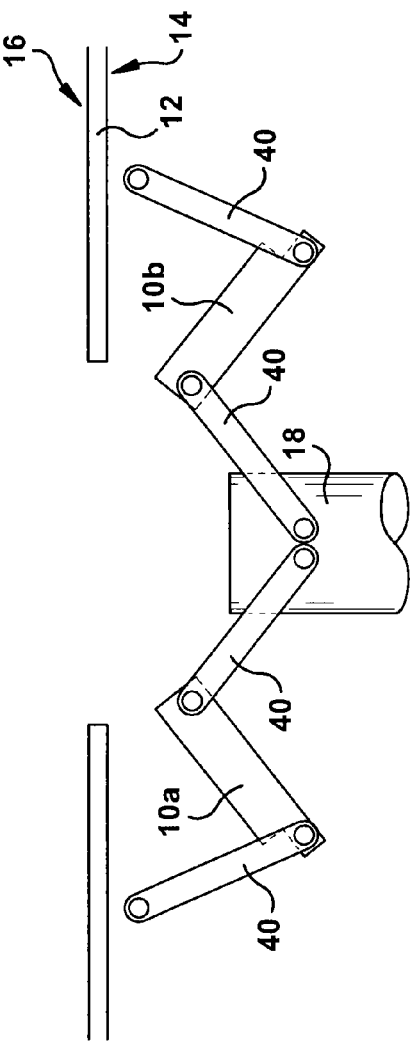
Figure 20A
Figure 20B

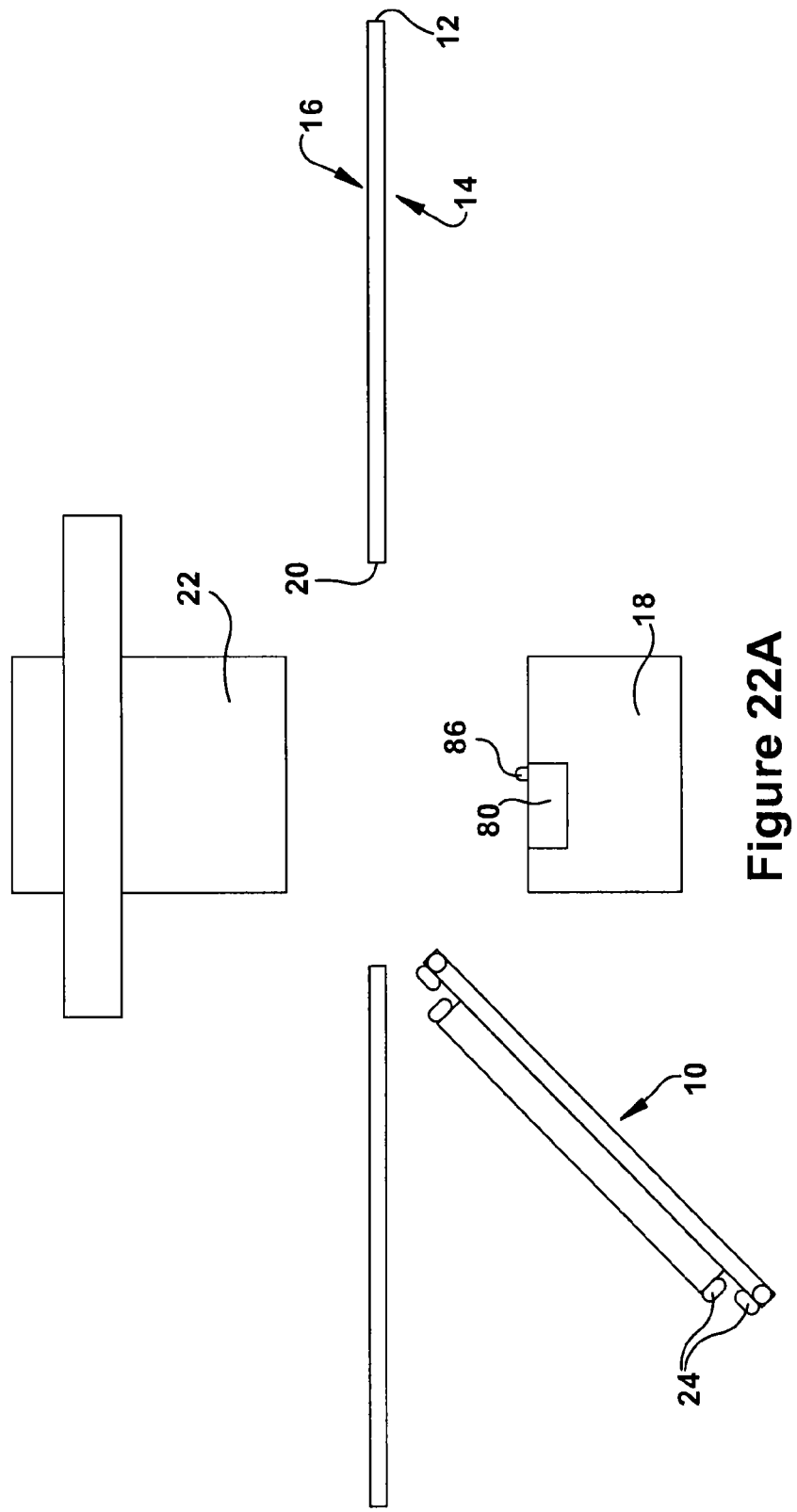

ACCESS PORT COVER

CROSS-REFERENCE TO RELATED APPLICATION

This application claims benefit from U.S. Provisional Patent Application No. 61/211,774, entitled "Access Port Cover," filed on Apr. 2, 2009, which is hereby incorporated by reference in its entirety.

FIELD OF THE INVENTION

The present invention relates generally to a system for selectively covering and granting access to a port and, more particularly, for covering and granting access to a fuel port or reservoir.

BACKGROUND

In recent years, the automobile industry has seen a change in the fuels used to operate vehicles. Traditionally, vehicles were designed to use petroleum based fuels such as gasoline. Recently, however, vehicles have been designed to use other forms of fuel such as electricity and hydrogen. Regardless of the type of fuel used, all fuel driven vehicles require a reservoir to store the fuel, and an access port where fuel can be added to the fuel reservoir.

Gasoline powered vehicles often include a fuel door in the vehicle body that provides access to the fuel reservoir. Additionally, many vehicles include a cap to cover the reservoir opening to prevent residue from entering the reservoir. While this design is adequate for gasoline powered vehicles, vehicles that use alternative fuels such as hydrogen and electric power require a design that addresses other issues.

For example, electric and hybrid vehicles may require an electrical power connection for an extended length of time in order to recharge the battery. Moreover, this connection may occur outdoors or in an unprotected setting where the vehicle may be open to harsh environmental conditions, such as water, ice, rain, snow, dirt, debris and the like. Traditional fuel doors may not provide adequate protection for these conditions.

SUMMARY

An access port cover is described. The access sport cover may seal an aperture located in a vehicle body whereby the access port cover may also provide access to a terminal located within the body. The access port cover may include a cover, a hinge mechanism and a linkage mechanism. The cover may include an outer portion and an inner portion, wherein the inner portion may include a first and a second end. The hinge mechanism may be located on each end of the inner portion. The linkage mechanism may be connected to the hinge mechanism, wherein the linkage mechanism may the said cover towards and away from the aperture. The cover and the linkage mechanism may be rotated into and stored within the body when the cover is not sealing the aperture in a closed position.

BRIEF DESCRIPTION OF THE DRAWINGS

Objects and advantages together with the operation of the invention may be better understood by reference to the following detailed description taken in connection with the following illustrations, wherein:

FIGS. 5A and 5B illustrate a cover with a secondary seal in a closed and open position, respectively.

FIGS. 6A and 6B illustrate a cover with a secondary seal and linkages in a closed and open position, respectively.

FIGS. 7A and 7B illustrate a cover with a lock.

FIGS. 8A and 8B illustrate a cover with a pivotable linkage in a closed and open position, respectively.

FIGS. 9A and 9B illustrate a cover with a spring and pivotable linkage in a closed and open position, respectively.

FIGS. 10A and 10B illustrate a cover with a spring and pivotable linkage in a closed and open position, respectively.

FIGS. 11A and 11B illustrate a cover with a linkage and a track in a closed and open position, respectively.

FIGS. 13A and 13B illustrate a cover with a shuttle, linkage and track in a closed and partially open position, respectively.

FIGS. 14A-C illustrate a cover with a track and a switch in a closed, partially open and open position, respectively.

FIGS. 16A and 16B illustrate a cover with a push and twist release in a closed and open position, respectively.

FIGS. 17A and 17B illustrate a front view of the cover of FIGS. 16A and 16B.

FIGS. 18A and 18B illustrate a cover having split doors in a closed and open position, respectively.

FIGS. 19A and 19B illustrate a cover having split doors and tracks in a closed and open position, respectively.

FIGS. 20A and 20B illustrate a cover having split doors and a four bar linkage system in a closed and open position, respectively.

FIGS. 22A and 22B illustrate a cover with a switch in an open and closed position, respectively.

DETAILED DESCRIPTION

Figure 1A:
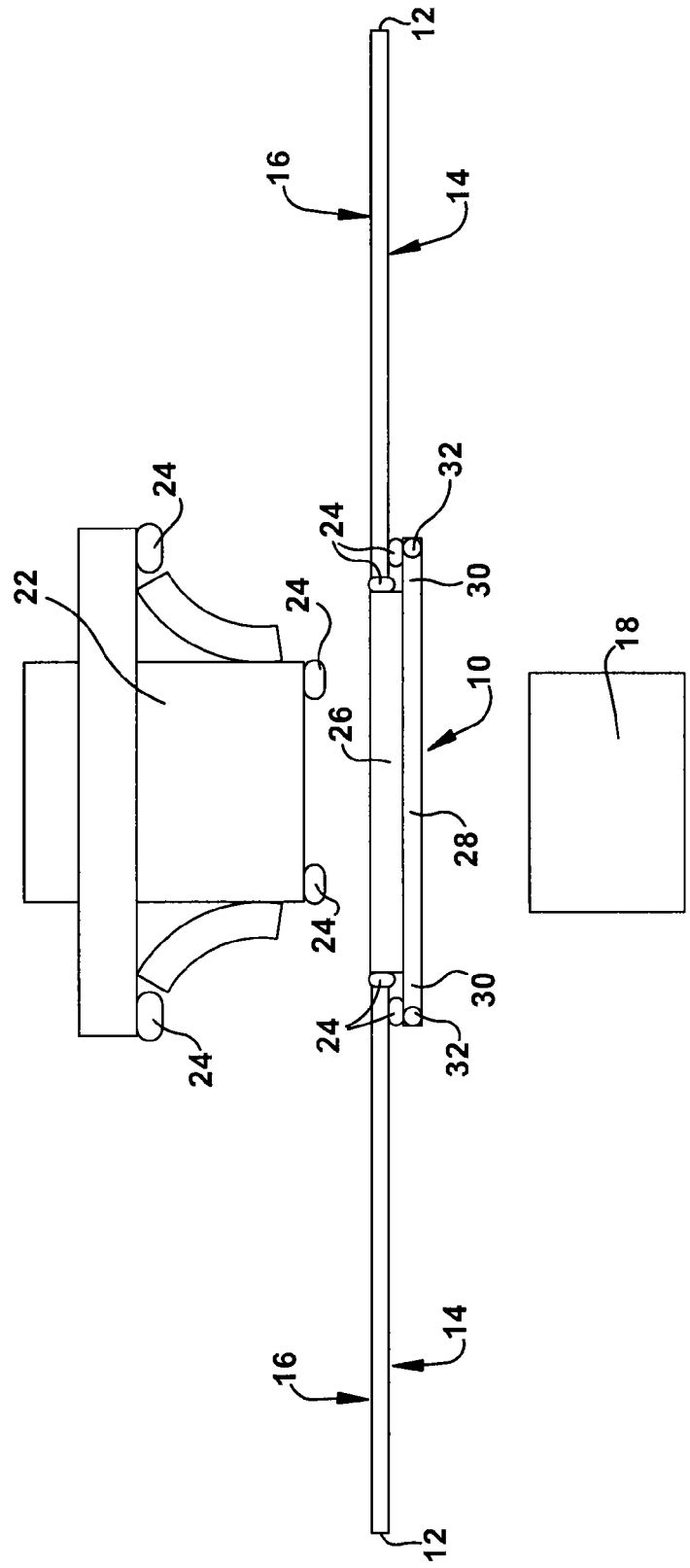
FIGS. 1A and 1B illustrate an access port cover in a closed position and an open position, respectively.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

An access port cover 10 is illustrated in FIGS. 1A-2, 4-14C, 16A-23B. The cover 10 may be used in conjunction with any appropriate type of aperture or access port 20 within a body 12. In a non-limiting example, the cover 10 may selectively provide access to an article or terminal 18 that may be located within the body 12 via the access port 20. The body 12 may be of any appropriate type of object, such as a vehicle body. The body 12 may include an inside or inner portion 14 and an outside or outer portion 16. The body 12 may protect any internal components that may be located inside 14 the body 12, such as the terminal 18, from any external components or occurrences located or taking place outside 16 of the body 12.

In a non-limiting example, the body 12 may be a vehicle body and the terminal 18 may be a fuel reservoir, such as a gasoline reservoir, hydrogen reservoir, electric reservoir, or any other appropriate type of fuel or charging reservoir. The cover 10 may be designed to protect the fuel reservoir or terminal 18 from harmful environmental conditions when the fuel reservoir access port 20 is not in use. Specifically, the cover 10 may seal off the access port 20 to prevent dirt, water, and other residue from coming in contact with the terminal 18.

In another non-limiting example, the cover 10 may be configured to selectively provide access to a recharging port 20 of an electric or hybrid vehicle (not shown). The recharging port 20 may include electric terminals 18, such as a negative and positive terminals (collectively the "terminal"), to connect to an outside electrical power supply and recharge the vehicle's electrical power reservoir. The cover 10 may be designed to selectively provide access to the terminal 18 and keep residue away from the terminal 18 when the access port 20 is not in use.

The cover 10 may be of any appropriate shape, size or configuration. The cover 10 may include an outer portion 26 and an inner portion 28. The outer portion 26 may be generally flush with the outside 16 of the body 12. The inner portion 28 may be of any appropriate size, such as slightly larger than the outer portion 26. The inner portion 28 may include tabs 30 and/or hinges 32 (FIGS. 1A, 6A and 10B). The tabs 30 may be located at any appropriate position on the cover 10, such as at the ends of the inner portion 28. The hinges 32 may be located at any appropriate position, such as on the tabs 30.

The cover 10 may be movable between an open and a closed position. The cover 10 may be operable by any appropriate operating mechanism or means, such as manually, driven by a motor, via linkages and the like. In the open position the cover 10 may be moved away from the aperture 20, whereas, in the closed position the cover 10 may be moved into a position to cover or seal the aperture 20.

In typical designs, the cover swings out and away from the access port opening 20 whereby the hinge mechanism may stick out and remain in the way of the access port 20. This may prevent the access port 20 from being easily sealed. In this type of situation, the cover and hinge mechanisms would also be exposed to the elements, such as ice, dirt, rain, snow, and the like, during charging, which may take several hours or over night. Unlike these typical hinged fuel doors that swing open towards the outside 16 of the vehicle body 12, the cover 10 may provide access to the terminal 18 by moving within or towards the inside 14 of the vehicle body 12.

By moving the cover 10 within the body 12, the cover 10 may remain out of the way during charging and remain protected from the elements, such as ice, water, dirt, rain, snow, debris and the like. The cover 10 may also be sealable during normal driving conditions, which may keep dirt, water and debris away from the terminal 18. The cover 10 may be stored within the vehicle cavity during charging. In this position, the cover 10 may remain out of the way during charging, whereby the charging connector body 22 may seal the recharging port 20. This seal may keep dirt and water out of the connection and out of the hinges 32 and operating mechanism used to open and close the cover 10.

In the closed position, the outer portion 26 of the cover 10 may be approximately flush with the vehicle body 12 (FIGS. 1A, 4, 5A, 6A, 7A-8A, 9A, 10A and 11A). The inner portion 28 of the cover 10 may be movably connected to the interior 14 of the vehicle body 12, such as via the tabs 30 and hinges 32 (FIGS. 1A, 6A and 10B). The cover 10 may move between a closed position (FIG. 1A), where access to the terminal 18 may be blocked, and an open position (FIG. 1B) where the cover 10 may be moved inside 14 the body 12 to provide access to the terminals 18.

Figure 4:
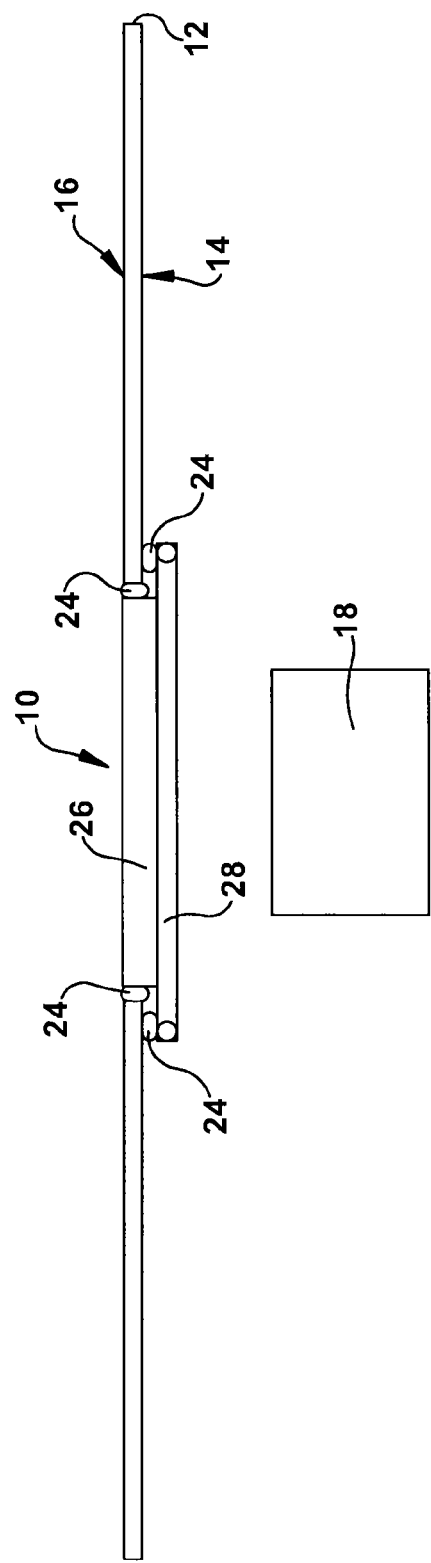
FIG. 4 illustrates a cover in a closed position with seals.

The cover 10 may provide one or more seals 24 (FIGS. 1A-2, 4 and 22A-23B). The seals 24 may be of any appropriate shape, size, type or configuration. The seals 24 may be fabricated out of any appropriate material. The seals 24 may be located at any appropriate position, such as on the cover 10, body 12, terminal 18 or connector 22. For example, the seals 24 may be located between the vehicle body 12 and the cover 10 when the access port 20 is not in use, or when the vehicle is not refueling or being charged (FIG. 4). For example, two seals 24 may be located between the cover 10 and the vehicle body 12 (FIG. 4).

The first seal 24 may be located between the opening 20 in the vehicle body 12 and the outer portion 26 of the cover 10, and the second seal 24 may be located between the inner portion 14 of the vehicle body 12 and the interior portion 28 of the cover 10 (FIG. 4). However, it will be appreciated that the cover 10 may include any desired or appropriate number of seals 24 at any desired or appropriate locations to prevent debris and residue from entering the fuel reservoir or terminal 18.

Figure 1B:
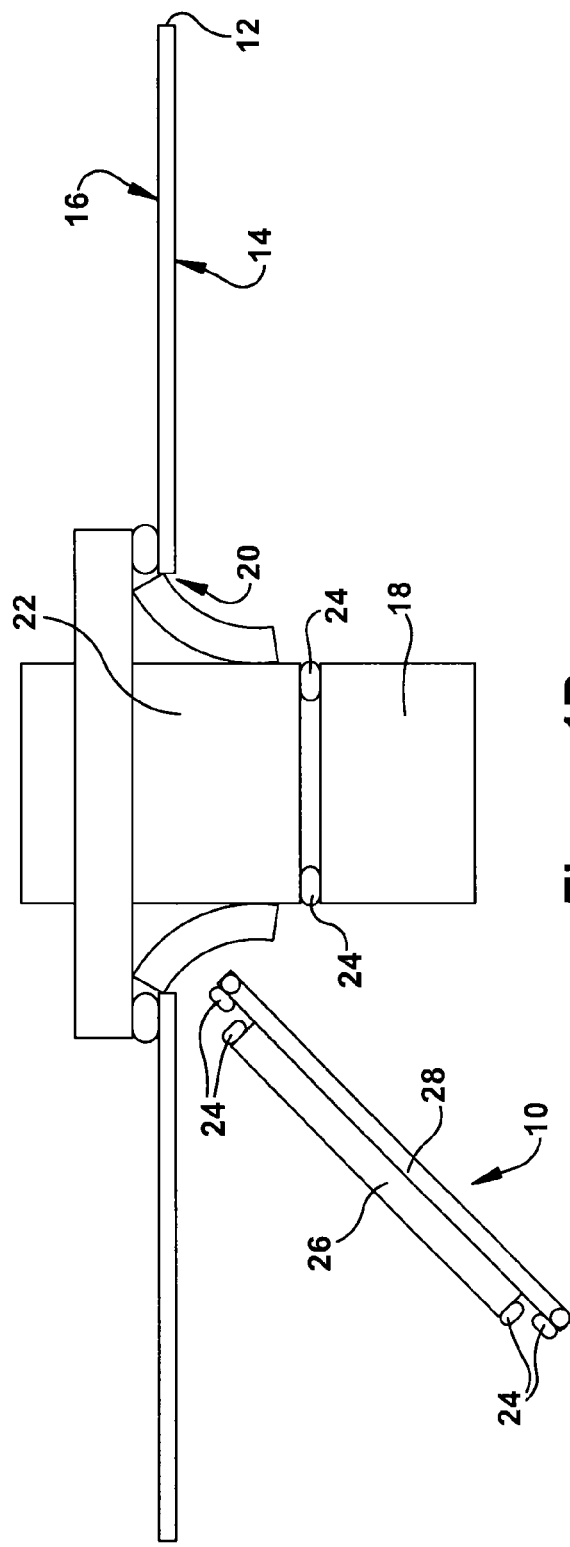
Figure 2:
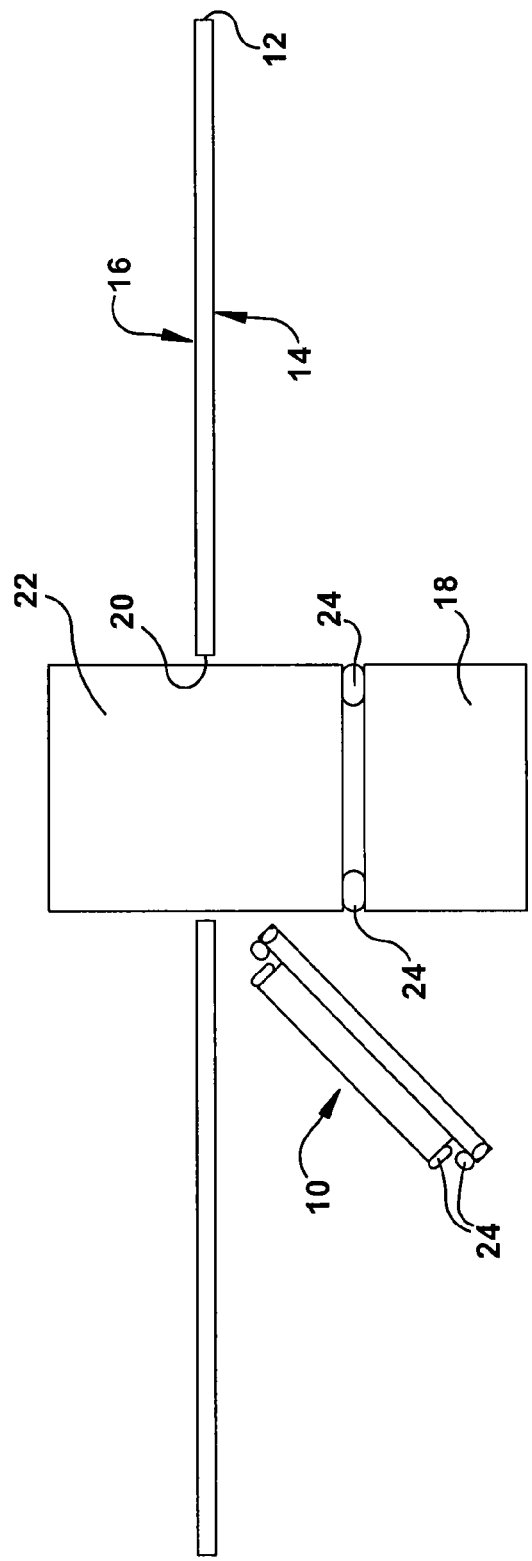
FIG. 2 illustrates a cover in open position with a connector connected to a terminal.

In the open position, a power source connector 22 may be connected to the terminal 18. The connection between the power source 22 and the terminal 18 may include a plurality of seals 24 to prevent debris and residue from getting into the system. For example, a seal 24 may be located between the vehicle body 12 and an outer portion of the connector 22 (FIG. 1B). Another seal 24 may be located within the diameter of the access port opening 20. Additional seals 24 may be located between the power source connector 22 and the terminal 18 (FIG. 1B).

The access port 20 may include a simple surface-to-surface seal 24 between the power source connector 22 and the access port opening 20. Specifically, the access port opening 20 may be sized and shaped to provide minimal clearance between the connector 22 and the opening 20, thereby preventing residue or debris from entering the access port 20 when the power source connector 22 is connected to the terminal 18. The access port 20 may further include a seal 24, such as an annular seal, along the interior circumference of the access port opening 20 that may minimize the clearance between the connector 22 and the vehicle body 12 (FIG. 1B).

Figure 3B:
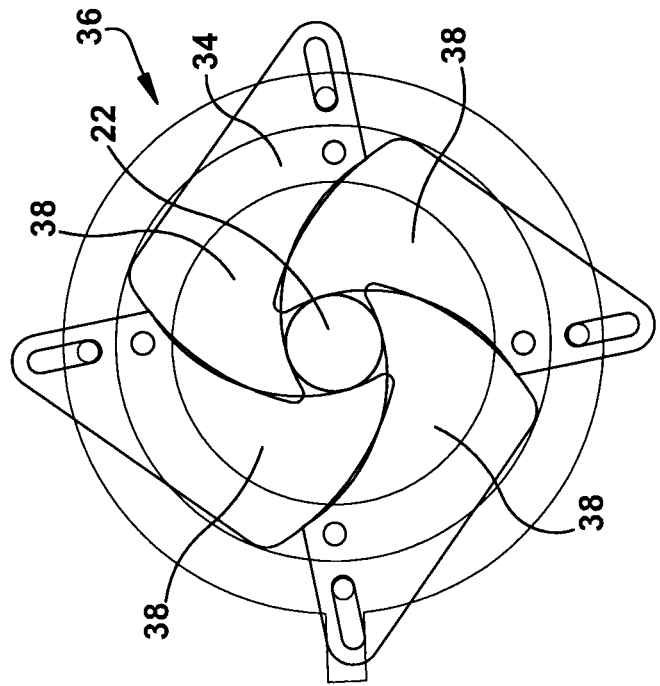
FIGS. 3A and 3B illustrate an iris diaphragm seal in an open and closed position, respectively.
Figure 3A:
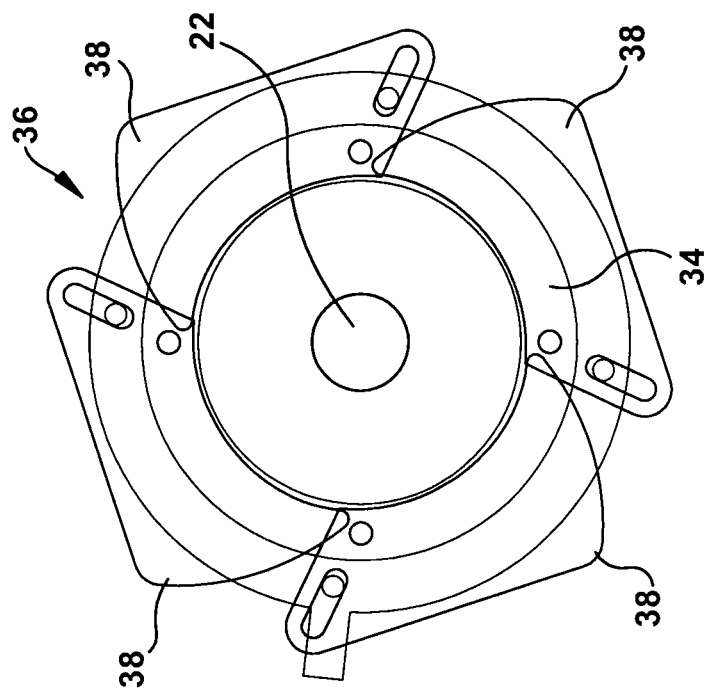

As an alternative, the access port 20 may include an iris diaphragm seal 36 (FIGS. 3A and 3B). The iris diaphragm seal 36 may be utilized where a larger opening may be needed. The iris diaphragm seal 36 may include a plurality of overlapping fins 38 that may form an opening 34 having a smaller diameter than the access port aperture 20. There may be any appropriate number of fins 38, such as two, three, four, etc.

The opening 34 may be opened and closed by any appropriate means, such as in a way similar to the iris of a camera (FIGS. 3A and 3B). The iris diaphragm 36 may open to provide access to the terminal 18 and may close around the power source connector 22 once contact with the terminal 18 has been achieved in order to prevent debris and residue from entering the system.

The cover 10 may include a hinged linkage 40 (FIGS. 5A-11B). The linkage 40 may be of any appropriate shape, size, type or configuration. The linkage 40 may be located at any appropriate position within the body 12. For example, the hinged linkage 40 may connect cover 10 to the interior 14 of the vehicle. The linkage 40 may be connected to the interior 14 of the body 12 by any appropriate means, such as with fasteners or the like. The cover 10 may move from a closed position to an open position by way of the linkage 40 (FIGS. 5A-11B).

The cover 10 may also include a secondary seal 44 (FIGS. 5A-6B and 14A-14C). The secondary seal 44 may protect the terminal 18 while the access port 20 is not in use. The secondary seal 44 may seal the terminal 18 during driving, thereby minimizing the air exposure of the terminal 18 when the vehicle is not being charged. The secondary seal 44 may also include seals 24 located between the secondary seal 44 and the terminal 18.

The secondary seal 44 may be of any appropriate shape, size or type. The secondary seal 44 may be located at any appropriate position, such as adjacent the terminal 18. The secondary seal 44 may be located approximately parallel to the cover 10 when the terminal 18 is not in use. The secondary seal 44 may be utilized to cover or shield the terminal 18 while the cover 10 is in the open position in order to minimize the terminal's 18 exposure to outer environment.

The secondary seal 44 may be connected to the cover 10 by any appropriate means, such as by way of one or more linkages, such as seal linkages 46 and springs (FIGS. 5A-6B). The seal linkage 46 may be of any appropriate shape, size, type or configuration. The seal linkage 46 may be connected to the cover 10 and the secondary seal 44 by any appropriate means, such as fasteners or the like.

The seal linkage 46 may be connected to and move the secondary seal 44 away from the terminal 18 when the cover 10 is moved to an open position (FIGS. 5B and 6B). The seal linkage 46 may also move the secondary seal 44 over the terminal 18 when the cover 10 is moved to a closed position (FIGS. 5A and 6A). It is to be understood that the seal linkage 46 may be of a single piece or multiple pieces hingedly connected to one another and should not be limited to that shown or described herein.

The secondary seal 44 may also be utilized with a seal guide 42 (FIGS. 5A and 5B). The seal guide 42 may be of any appropriate shape, size, type or configuration. The seal guide 42 may be located at any appropriate position, such as being located adjacent the terminal 18. The seal guide 42 may provide guidance for the secondary seal 44 to move off of the terminal 18 while the cover 10 is being opened.

The secondary seal 44 may be moved into and out of position by any appropriate means, such as by a drive linkage 48 (FIGS. 6A and 6B). the drive linkage 48 may be of any appropriate shape, size, type or configuration. The drive linkage 48 may be located at any appropriate position, such as being hingedly attached to the cover linkage 40 and the seal linkage 46 (FIGS. 6A and 6B).

Optionally, the cover 10 may be configured to be locked when not in use, so as to prevent unwanted access to the fuel reservoir or terminal 18, prevent theft, or prevent the cover 10 from opening at unwanted times. This may be achieved by making the gear train non back-drivable or by utilizing a secondary latch. For example, the cover 10 may include a lock 72 (FIGS. 7A and 7B). The lock 72 may be of any appropriate shape, size, type or configuration. The lock 72 may be located at any appropriate position. For example, the lock 72 may be located on either the interior 14 or exterior 16 of the vehicle body 12, or both. The lock 72 may be either a separate mechanism or one internal to the cover 10 opening and closing operating mechanism, such as a dog clutch.

The lock 72 may be activated or operated by any appropriate means, such as either manually or automatically. For example, the lock 72 may be operated by a solenoid 62, a rack and pinion lock 64 or a key (not shown). The lock 72 could be oriented in any direction and be applied anywhere in the drive train or operating mechanism. The linkages that move the cover 10 between an open and closed position may be driven by a gear train or gears. The gears may be configured so as not to be manually back-driven, thereby preventing the cover 10 from being opened unless driven by the gears.

The cover 10 may include a pivoting linkage 50 (FIGS. 8A-10B). The pivoting linkage 50 may be of any appropriate shape, size, type or configuration. The pivoting linkage 50 may be located at any appropriate position. For example, the pivoting linkage 50 may be hingedly attached to the cover 10. The pivoting linkages 50 may also be pivotable about a stationary point within the body 12 (FIGS. 8A-10B).

It is to be understood that the cover 10 may be utilized with any appropriate number, type, or configuration of linkages. These linkages may be manually or power operated, such as with any appropriate type of drive system 60. The drive system 60 may utilize a motor 56. These linkages may also be connected to a gear assembly that may be driven by the motor 56. The motor 56 may drive the gears in a first direction to close the cover 10, and drive the gears in the opposite direction to open the cover 10. As the gears move, the hinged gears may rotate to move the cover 10. Alternatively, any appropriate cover 10 and linkage configuration may be used without a motor 56 or gears to drive the linkages. In this configuration, the cover 10 may be manually opened or closed.

The cover 10 may further utilize a spring 66 (FIGS. 9A-10B). The spring 66 may be of any appropriate shape, size or type, such as a toggle spring, torsion spring or the like. The spring 66 may hold the cover 10 in an open or closed position (FIGS. 9A-10B). The spring 66 may be located at any appropriate position, such as being located on or adjacent to the cover linkage 40 to bias the linkage 40 in a specified direction.

For example, the spring 66 may bias the cover 10 toward an open (FIG. 9B) or closed position (FIGS. 9A and 10A). When the cover 10 is manually pushed open into the vehicle body 12, a detent (not shown) may catch and hold the cover 10 open (FIG. 10B). When the power supply connector 22 is inserted into the access port 20, the connector 22 may trip the detent catch whereby the cover 10 may be permitted to close passively once the power supply connector 22 is removed.

Alternatively, the cover 10 may be configured to function as a tip and slide. In this configuration, the cover 10 may be moved away from the vehicle body 12 before being moved along a track 70 to an open position. The cover 10 may further include one or more tracks 70 to guide its movement (FIGS. 11A-14C). The tracks 70 may be of any appropriate shape, size, type or configuration.

Figure 15:
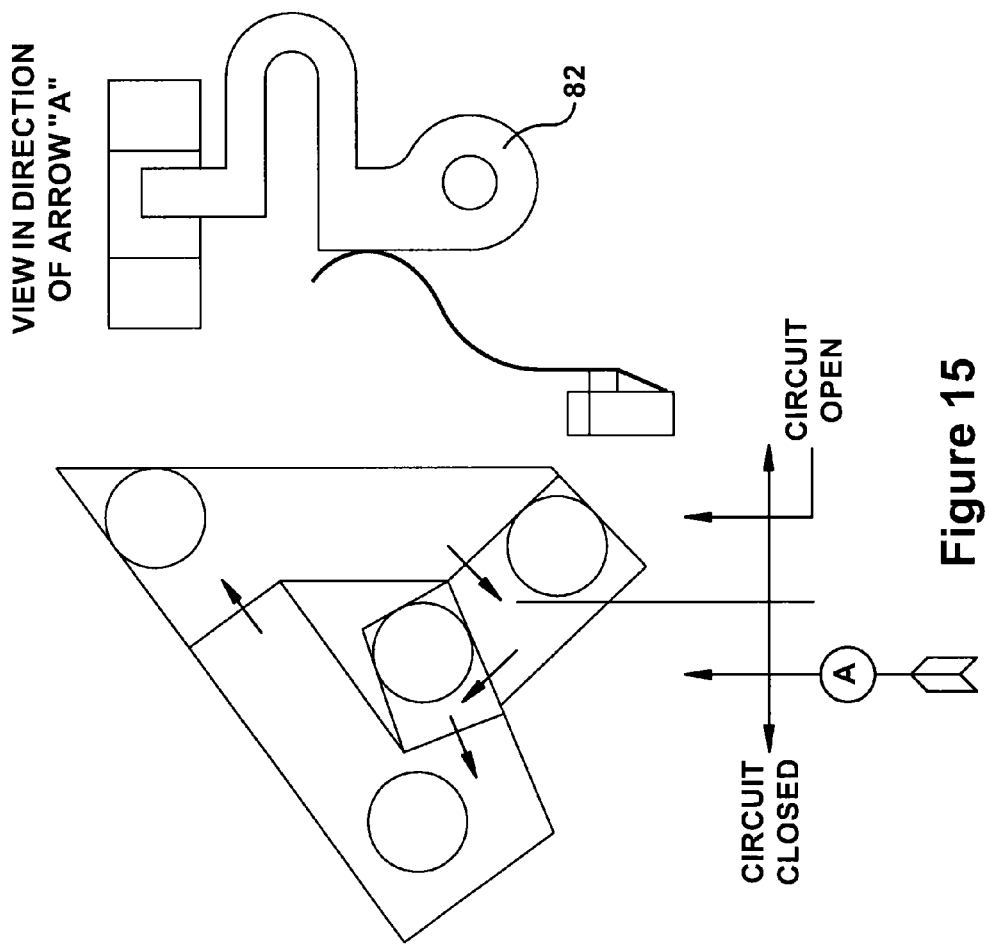
FIG. 15 illustrates a cover retention mechanism.

In a tip and slide configuration, a cover retention mechanism may be utilized with a switch or lever 82 for a manually activated system with a power driven mechanism (FIG. 15). The cover retention mechanism may follow any appropriate number of tracks or paths shown by arrows (FIG. 15). The cover 10 may include a post feature which may follow these tracks. When the cover 10 is initially depressed, the post may follow the vertical leg of the track. At the end of the vertical leg of the track, the post may fall into a detent whereby the post may no longer follow the original track, but must follow a second leg of the track. During travel along this track, the switch in the mechanism may be made indicating to the control mechanism to power open the cover 10.

At the end of the second leg, the cover 10 may rest in a saddle where it may stay until completing a third leg when the mechanism signals to close the cover 10 (FIG. 15). The mechanism may power the cover 10 closed. During this closing event, the post may travel along the third leg. During this leg the post may toggle over another biasing feature. At the end of the power close event the cover 10 may be released and the post may follows a fourth leg of the track allowing the cover 10 to return to the fully closed position.

Figure 12:
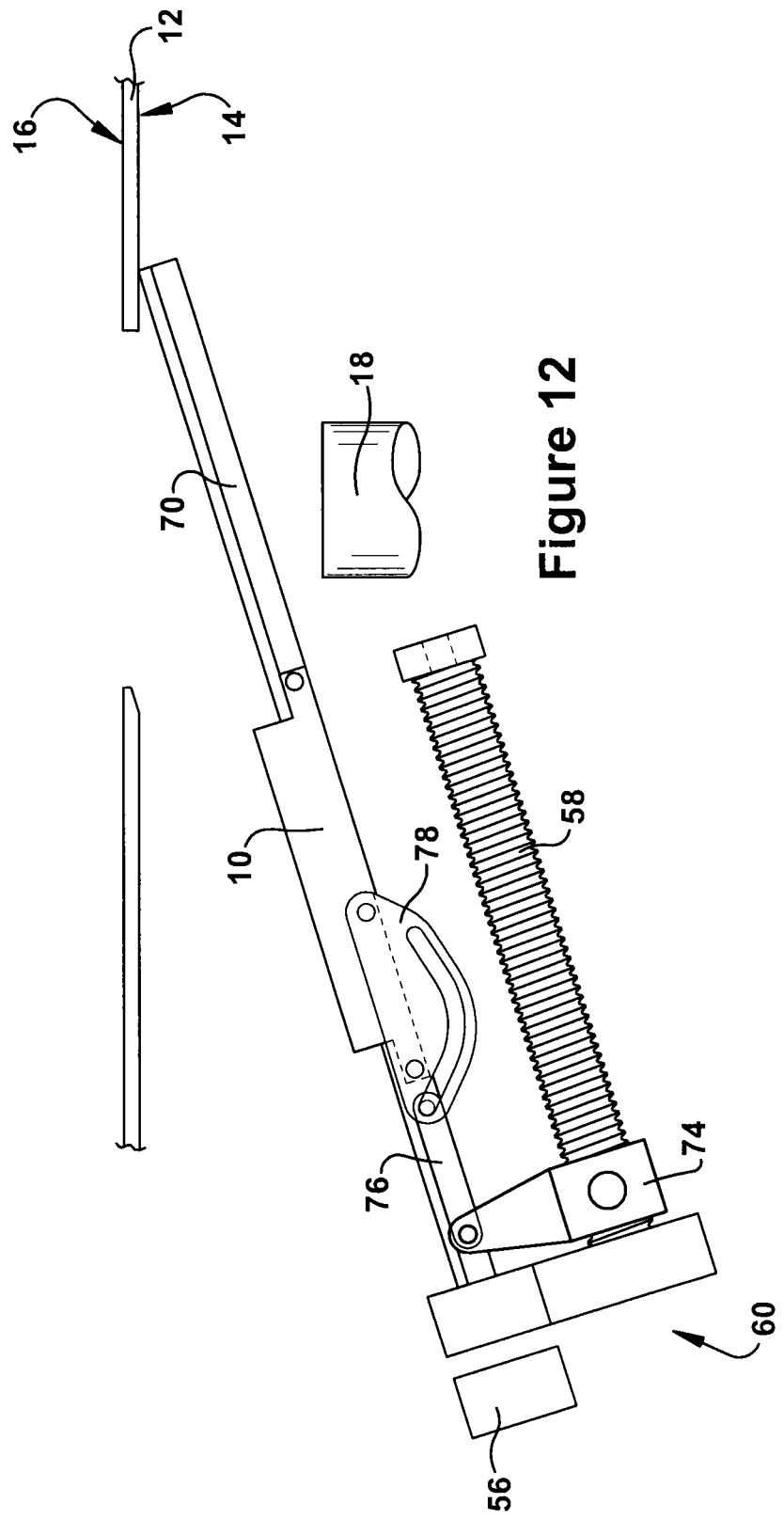
FIG. 12 illustrates a cover with a shuttle, linkage and track in an open position.

The cover 10 may be utilized with a linkage with a rack 78 and a shuttle 76 (FIGS. 12-13B). The linkage with rack 78 may include a slotted area where the shuttle 76 may travel. The cover 10 may be connected to the shuttle 76 by way of the linkage 78, whereby the shuttle 76 may glide along the track 70. As the shuttle 76 travels along the track 70 it may force the linkage with rack 78 downward to move the cover 10 between an open position and a closed position. The shuttle 76 and linkage with rack 78 may be of any appropriate shape, size, type or configuration and may be located at any appropriate position.

The tracks 70 may be located at any appropriate position. For example, the cover 10 may be connected to the track 70 at one or more points to allow the cover 10 to slide open as it is driven by the linkages 40, 78. The cover 10 may be opened by driving the shuttle 76 away from the access port opening 20, thereby rotating the cover 10 away from the opening 20 via the linkage 78 and sliding the cover 10 to an open position.

The shuttle 76 may be driven by a motor 56 (FIGS. 12-13B). For example, the shuttle 76 may be connected to a drive nut 74 on a drive gear or screw 58 that may be driven by a motor 56. As an alternative, the cover 10 may be manually tipped to initiate the open sequence. For example, the cover 10 may be pushed into the vehicle body 12, thereby rotating the linkage 78 and pushing the cover 10 toward the track 70. The shuttle 76 may then guide the cover 10 to an open position. The motor 56 may drive the shuttle 76 back to a closed position via the drive nut 74 and drive screw 58.

Figure 14C:
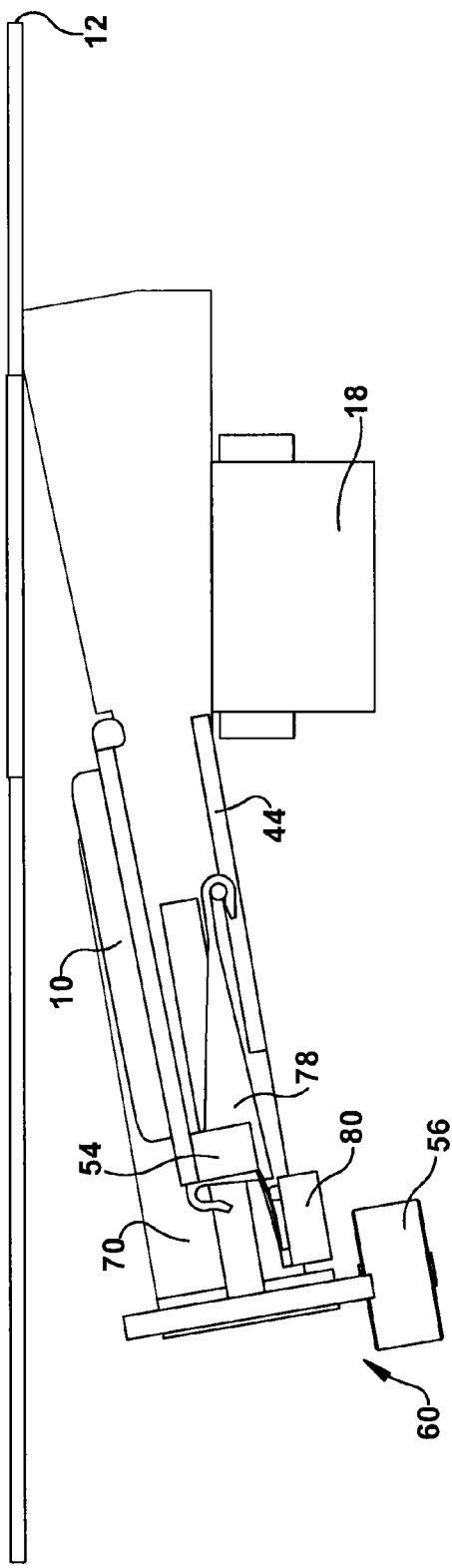

The cover may also be utilized with a switch 80 (FIGS. 14A-14C). The switch 80 may be of any appropriate shape, size or type and may be located at any appropriate location, such as adjacent to the linkage 78. The cover 10 may include a protrusion 54. As the cover 10 is pushed within the body 12, the protrusion 54 may engage the switch 80. after the switch 80 is engaged, the linkage 78 may pull the cover 10 along the track 70 to an open position.

The cover 10 may be opened through a push-and-twist or rotating mechanism 84 (FIGS. 16A-17B). The rotating mechanism 84 may be of any appropriate shape, size, type or configuration. For example, the rotating mechanism 84 may include a slot 92 and a pin 94, whereby the pin 94 may slide along the slot 92 during rotation (FIGS. 16A and 16B). The rotating mechanism 84 may be located at any appropriate position and may be attached to the cover 10 by any appropriate means. For example, the cover 10 may be rotatably connected to the cylinder 84.

The cover 10 may be biased to engage the vehicle body 12. When the cover 10 is pushed into the body 12, the cover 10 may rotate about the cylinder or mechanism 84 to move away from the access port opening 20 (FIGS. 16B and 17B). The cover 10 may return to a closed position by rotating back about the cylinder or mechanism 84 (FIGS. 16A and 17A). The cover 10 may be moved or positioned manually or driven by a motor 56. For example, the cylinder 84 may be connected to a motor 56 to rotate the cover 10 from an open position to a closed position.

As an alternative, the cover 10 may include a split-door configuration 10a, 10b (FIGS. 18A-20B). For example, the cover 10 may include two portions 10a, 10b, whereby each cover portion 10a, 10b may be connected or hinged to a side of the access port opening 20. The cover portions 10a, 10b may be opened into the body 12 to expose the terminal 18. The split-door portions 10a, 10b may be manually or power operated.

The split-door cover 10 may also utilize a track 70 to guide the split doors 10a, 10b (FIGS. 19A and 19B). The doors 10a, 10b may be slidably engaged with the track by any appropriate means. The doors 10a, 10b may slidably engaged with the track 70 to move between an open position and a closed position (FIGS. 19A and 19B).

Alternatively, the split doors 10a, 10b may be connected to a plurality of linkages 40, such as a four bar linkage system (FIGS. 20A-21B). The linkages 40 may be engaged with the cover 10 by any appropriate means. The linkages 40 may be hingedly connected to the split doors 10a, 10b and the terminal 18 in order to move the doors 10a, 10b away from the opening 20 and provide access to the terminal 18 (FIGS. 20A-20B). The hinged split doors 10a, 10b may be manually operated or power operated.

Figure 21A:
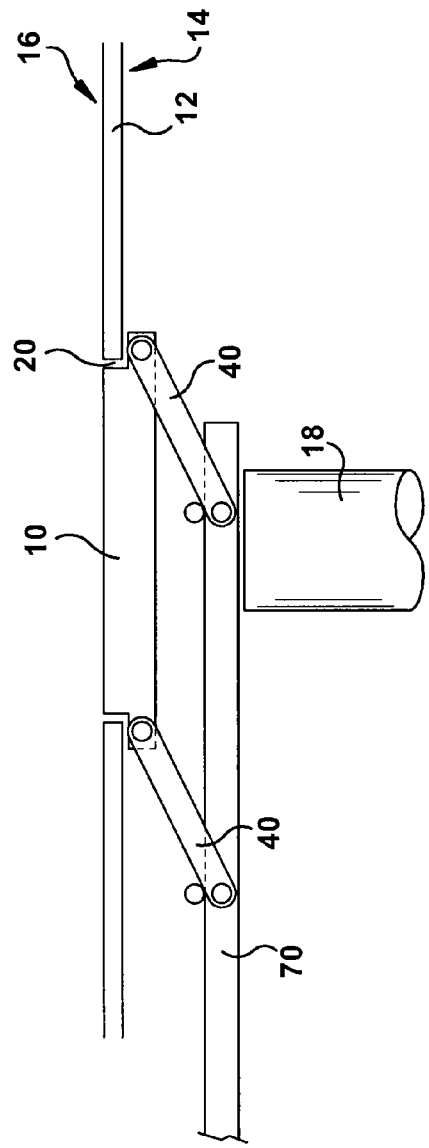
FIGS. 21A and 21B illustrate a cover with a four bar linkage system and a track in a closed and open position, respectively.
Figure 21B:
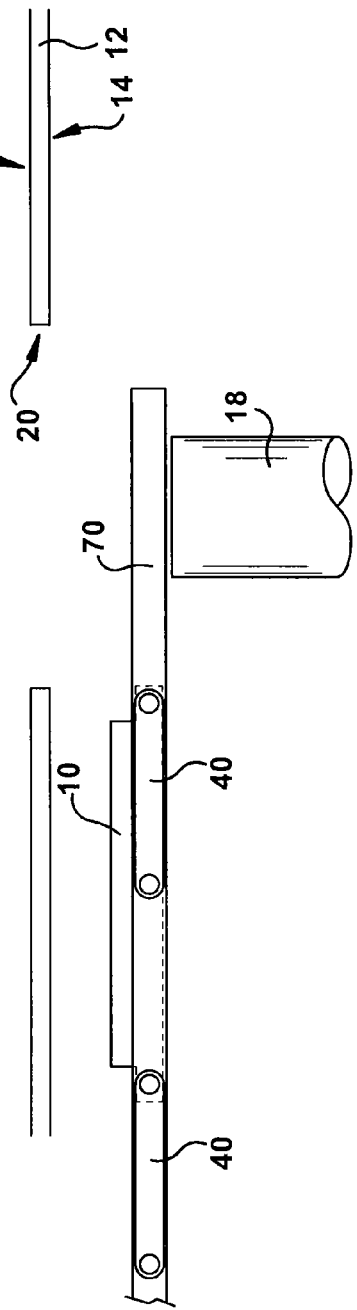

The cover 10 may also utilize linkages 40 located on both sides of the cover 10 and a track 70, whereby the cover 10 may be slide away from the access port opening 20 to one side to an open position to provide access to the terminal 18 (FIGS. 21A and 21B). This same configuration may also utilize split doors 10a, 10b.

Figure 22B:
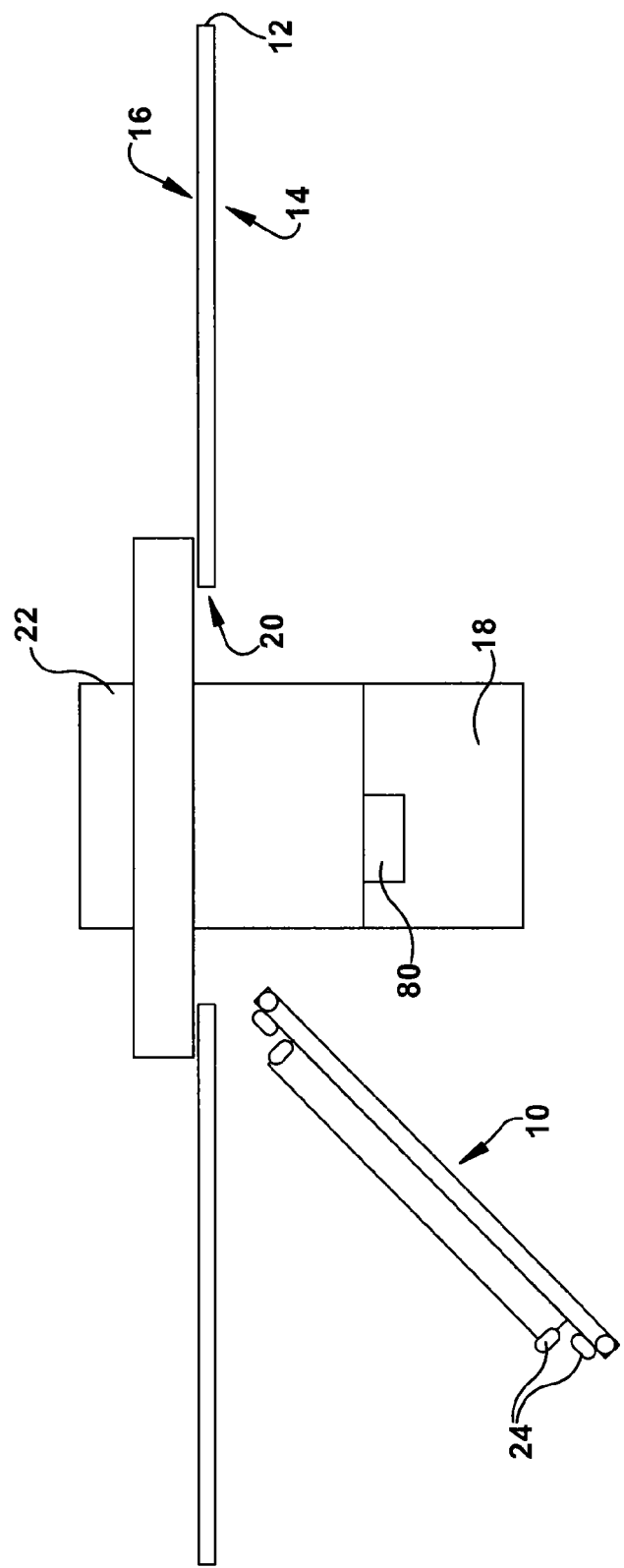
Figure 23A:
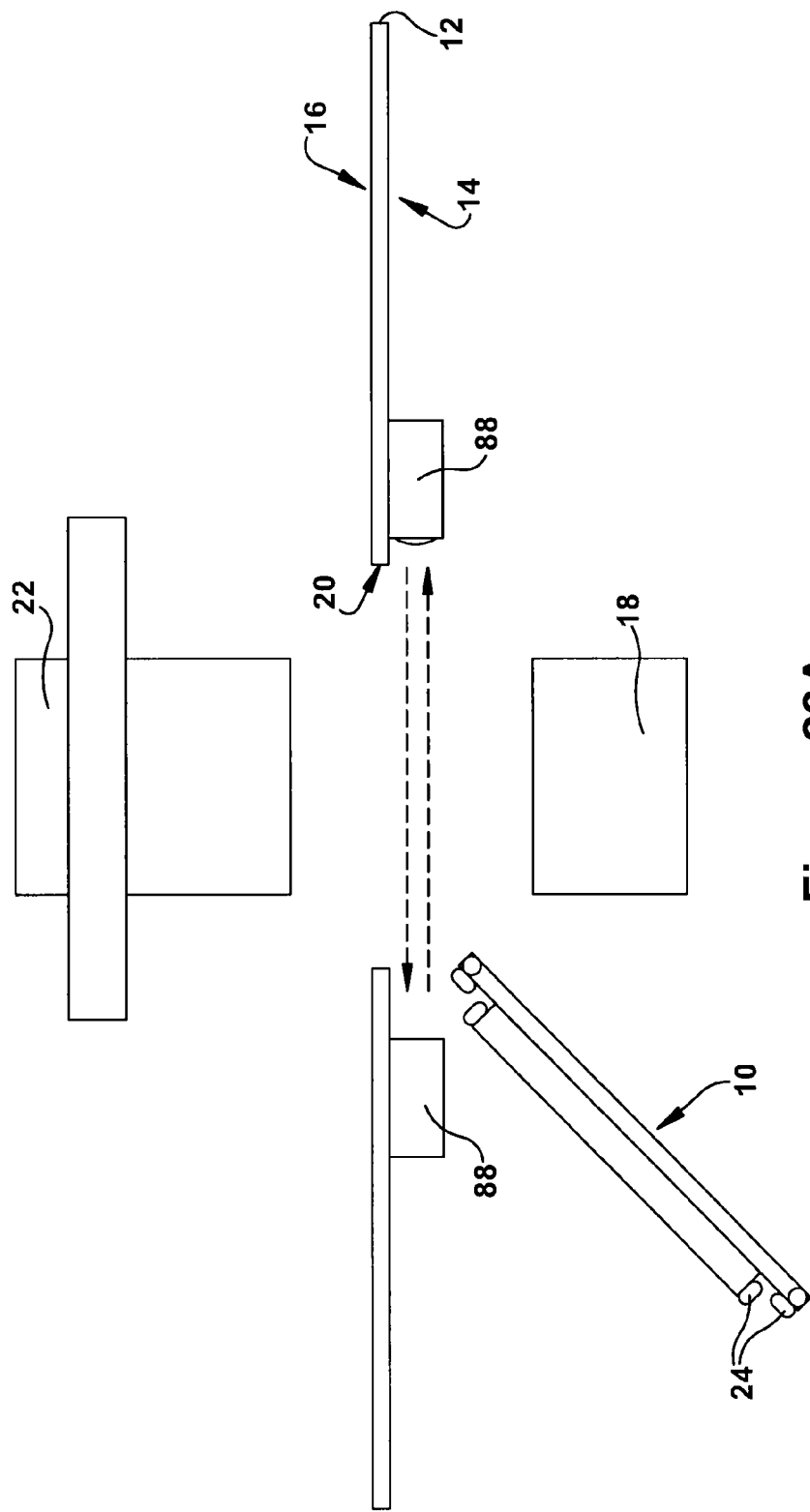
FIGS. 23A and 23B illustrate a cover with sensors in an open position, respectively.
Figure 23B:
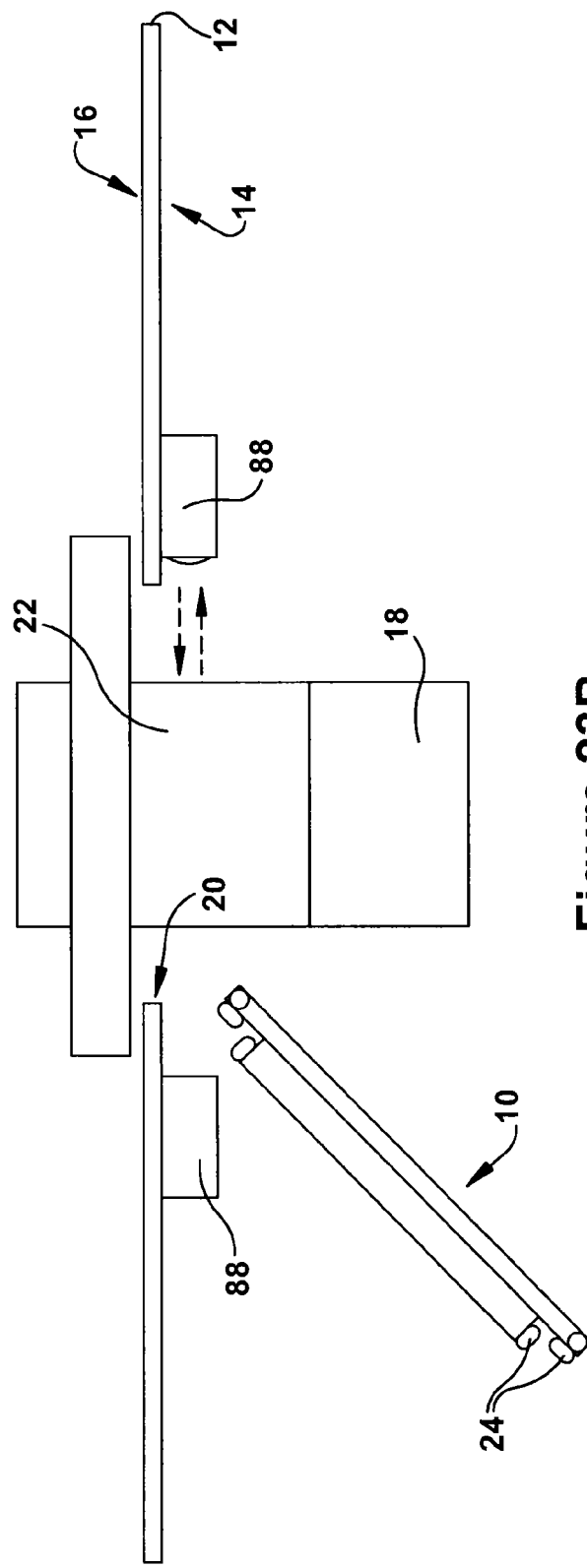

The vehicle body 12 may include one or more sensors 88 (FIGS. 22A-23B). The sensors 88 may be of any appropriate shape, size or type, such as proximity sensors, infrared sensors, pinch sensors, photo or optic sensors, ultrasonic sensors, and the like. The sensors 88 may be located at any appropriate position, such as within the body 12. The sensors 88 may be utilized to determine when to open and close the cover 10. For example, the sensors 88 may be used to sense when the power supply connector 22 is connected to the terminal 18 (FIGS. 22B and 23B). For example, when the connector 22 is removed, the vehicle 12 may close the cover 10 to prevent the terminal 18 from being exposed to a harmful environment.

A switch 80 may also be used with the cover 10 (FIGS. 22A and 22B). The switch 80 may be of any appropriate shape, size or type. The switch 80 may be located at any appropriate position. For example, the switch 80 may be located adjacent to or on the terminal 18. The switch 80 may include a button 86. In this example, after the button 86 is released or deactivated from being touched by the connector 22, the cover 10 may move back into a closed position to protect the terminal 18.

In one example, the vehicle body 12 may include sensors 88 located across from each other on either side of the access port opening 20 (FIGS. 23A and 23B). These sensors 88 may determine when a power source 22 is connected to the terminal 18. For example, the sensors 88 may be infrared sensors, whereby when the sensors 88 can no longer see each other, or their connection is broken, the sensors 88 can determine that a power source 22 is connected and the vehicle 12 is charging. The vehicle 12 may also measure the resistance across the terminals 18 or use other detection means to determine whether a power supply connector 22 is connected to the terminal 18.

The cover 10 may utilize any appropriate type of drive system 60 to drive the cover 10 between an open and closed position. For example, any appropriate type of motor and gear system may be used. Alternatively, the drive train may include a rack and pinion with dual opposed worm gears, whereby the opposed gears may balance or resist separating force and prevent sliding friction. While the cover 10 may be shown and described as utilizing certain types of drive systems 60, it is to be understood that any appropriate type of drive system could be used to move the cover 10 and should not be limited to that shown or described herein.

The gear system may be designed to be back drivable. For example, the gear system may include any appropriate type of slip clutch (not shown). The slip clutch would allow the cover 10 to be manually pushed into an open position while the clutch slips about a drive surface.

The cover 10 may also be utilized with any appropriate type of drive clutch (not shown). The drive clutch may include a drive lever, worm gear, inertial disc, spring and a driven gear with an annular ring of teeth (all not shown). When the worm gear is driven, the inertial disc may lag and drive the lever into the driven gear. If the lever misses the driven gear, the mass of the level spinning may also cause the lever to drive into the driven gear. If the driven gear is driven, the lever does not engage.

The drive clutch may break the connection between the cover 10 and the gear system to allow the cover 10 to be moved manually. When the motor is engaged, the drive clutch may remain engaged. When the motor 56 is stopped, however, the drive clutch may disengage and allow the cover 10 to be manually opened.

As an alternative to utilizing a clutch, the cover 10 may be designed to break away from the drive system 60 if necessary. Specifically, the cover 10 may snap to the drive element, such as the drive nut. For example, the cover 10 may mechanically disconnect from the drive element if adequate pressure is applied.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. An access port cover for sealing an aperture located in a body and providing access to a terminal located within said body, said access port cover comprising:
    a cover having an outer portion and an inner portion, wherein said inner portion includes first and second ends;
    first and second hinge mechanisms attached to said first and second ends, respectively of said inner portion;
    a pivoting linkage hingedly attached to said second hinge mechanism on said second end of said inner portion, wherein said pivoting linkage pivots about a stationary point within the body;
    a linkage mechanism connected to said body and to one of said hinge mechanisms, wherein said linkage mechanism is configured to position said cover from an open position to a closed position relative to said aperture, wherein said cover is laterally displaced and longitudinally displaced from said aperture when moving from said closed position to said open position; and
    wherein said cover and linkage mechanism are rotated into and stored within the body when said cover is not sealing the aperture.

2. The cover of claim 1 further comprising a plurality of seals located between said cover and the body.

3. The cover of claim 1 further comprising at least one sensor located on either side of the aperture.

4. The cover of claim 1 further comprising a spring connected to said linkage mechanism for biasing said cover in said open or closed position relative to the aperture.

5. The cover of claim 1, wherein said outer portion of said cover is flush with the body.

6. An access port cover for sealing an aperture located in a body and providing access to a terminal located within the body, the terminal engageable with a power supply connector, the access port cover comprising:
    a cover having first and second ends positioned within the body;
    first and second hinge mechanisms attached to said first and second ends, respectively;
    a linkage pivotally connected to the body at a pivot and to said first hinge mechanisms, wherein said linkage rotates relative to said pivot causing said cover to move laterally and longitudinally away from said aperture whereby said cover and linkage are rotated into and stored within said body when said cover is not sealing the aperture;
    a biasing member connected to said linkage for biasing said cover in a generally open or closed position relative to said aperture; and
    a pivoting linkage hingedly attached to said second hinge mechanism at a first end and attached to said body at a second end, wherein said pivoting linkage pivots said second end within said body.

7. The access port cover of claim 6, wherein insertion of the power supply connector into the aperture causes said cover to be held in said generally open position.

8. The access port cover of claim 7, wherein removing the power supply connector from the aperture disengages said cover moving said cover to said generally closed position.

9. The access port cover of claim 6, wherein said cover includes an outer portion whereby said outer portion is flush with the body.

10. The access port cover of claim 6, wherein said biasing member comprises a spring.

11. The access port cover of claim 6, further comprising a plurality of seals located between said cover and the body.

12. The access port cover of claim 6, further comprising at least one sensor located on either side of the aperture.

13. The access port cover of claim 12, wherein said sensor identifies the power supply connector not being operatively connected with the terminal.

14. The access port cover of claim 13, wherein said sensor identifying the power supply connector not operatively connected with the terminal causes said cover to close.

15. An access port cover for sealing an aperture located in a body and providing access to a terminal located within the body, the terminal engageable with a power supply connector, the access port cover comprising:
    a cover having first and second ends positioned within the body;
    first and second hinge mechanisms attached to said first and second ends, respectively;
    a linkage connected to the body and to said first hinge mechanisms, wherein said linkage rotates about a pivot point moving said cover laterally and longitudinally away from said aperture whereby said cover and linkage are stored within said body when said cover is not sealing the aperture;
    a biasing member connected to said linkage for biasing said cover in a generally open or closed position relative to the aperture; and
    wherein insertion of the power supply connector into the aperture holds said cover in the generally open position and removing the power supply connector from the aperture automatically moves said cover to the generally closed position.

16. The access port cover of claim 15, further comprising at least one sensor located within said body, wherein said sensor identifies when the power supply connector is not operatively connected with the terminal causing said cover to move to the generally closed position.

17. The access port cover of claim 15, wherein said biasing member comprises a spring.

* * * * *